US012309164B1

United States Patent
Kondra et al.

(10) Patent No.: US 12,309,164 B1
(45) Date of Patent: May 20, 2025

(54) ACCESS CONTROL MANAGEMENT

(71) Applicant: Citigroup Inc., New York, NY (US)

(72) Inventors: Sridhar Kondra, Rutherford, NJ (US);
Geoff Dickstein, Rutherford, NJ (US);
Sai Santosh Sala, Tampa, FL (US);
Damien Ferguson, Dublin (IE);
Damian Furlong, Dublin (IE); Jody Spearing, Dublin (IE)

(73) Assignee: Citigroup Inc., New York, NY (US)

( * ) Notice: Subject to any disclaimer, the term of this patent is extended or adjusted under 35 U.S.C. 154(b) by 0 days.

(21) Appl. No.: 18/923,219

(22) Filed: Oct. 22, 2024

(51) Int. Cl.
*H04L 9/40* (2022.01)

(52) U.S. Cl.
CPC .................. *H04L 63/105* (2013.01)

(58) Field of Classification Search
CPC ...... H04L 63/105; H04L 63/10; H04L 63/101
USPC .......................................................... 726/4
See application file for complete search history.

(56) References Cited

U.S. PATENT DOCUMENTS

| | | | | |
|---|---|---|---|---|
| 11,425,171 | B2 * | 8/2022 | Zhu | H04L 63/0807 |
| 2012/0060207 | A1 * | 3/2012 | Mardikar | H04L 63/20 |
| | | | | 726/4 |
| 2023/0097515 | A1 * | 3/2023 | Wilson | H04L 63/0815 |
| | | | | 726/8 |
| 2024/0126794 | A1 * | 4/2024 | Cook | H04L 51/02 |
| 2024/0396884 | A1 * | 11/2024 | Lin | H04L 63/0807 |

OTHER PUBLICATIONS

Resource and Role Hierarchy Based Access Control for Resourceful Systems, Solanki et al, Jun. 2018 (Year: 2018).*

* cited by examiner

*Primary Examiner* — Jahangir Kabir
(74) *Attorney, Agent, or Firm* — Davis Wright Tremaine LLP

(57) ABSTRACT

Attributes and roles are obtained from a storage device that includes information associated with computing resources. Multiple data structures are generated based, at least in part, on correlations between different types of attributes. In response to a request for access permissions, access tokens are provided based, at least in part, on at least one of the multiple data structures.

20 Claims, 13 Drawing Sheets

ACCESS CONTROL MANAGEMENT

BACKGROUND

New employees require access permissions to various computing resources, such as email, application stacks, and internal networks, to perform their job functions. Typically, obtaining these access permissions necessitates submitting multiple access permission requests for each required computing resource as required for their projects. This process involves identifying the necessary computing resources and submitting detailed requests for multiple permissions, which can lead to delays before the employee receives the required access. Frequently, one or more necessary access permissions are overlooked and not identified as missing until they are needed, sometimes at a critical moment in project development. These delays result in the inefficient use of computing resources, as servers and other infrastructure remain underutilized while awaiting approval. Additionally, project completion may be delayed, leading to underutilized systems and a reduction in overall productivity.

BRIEF DESCRIPTION OF THE DRAWINGS

Various techniques will be described with reference to the drawings, in which.

SUMMARY

Figure 1:
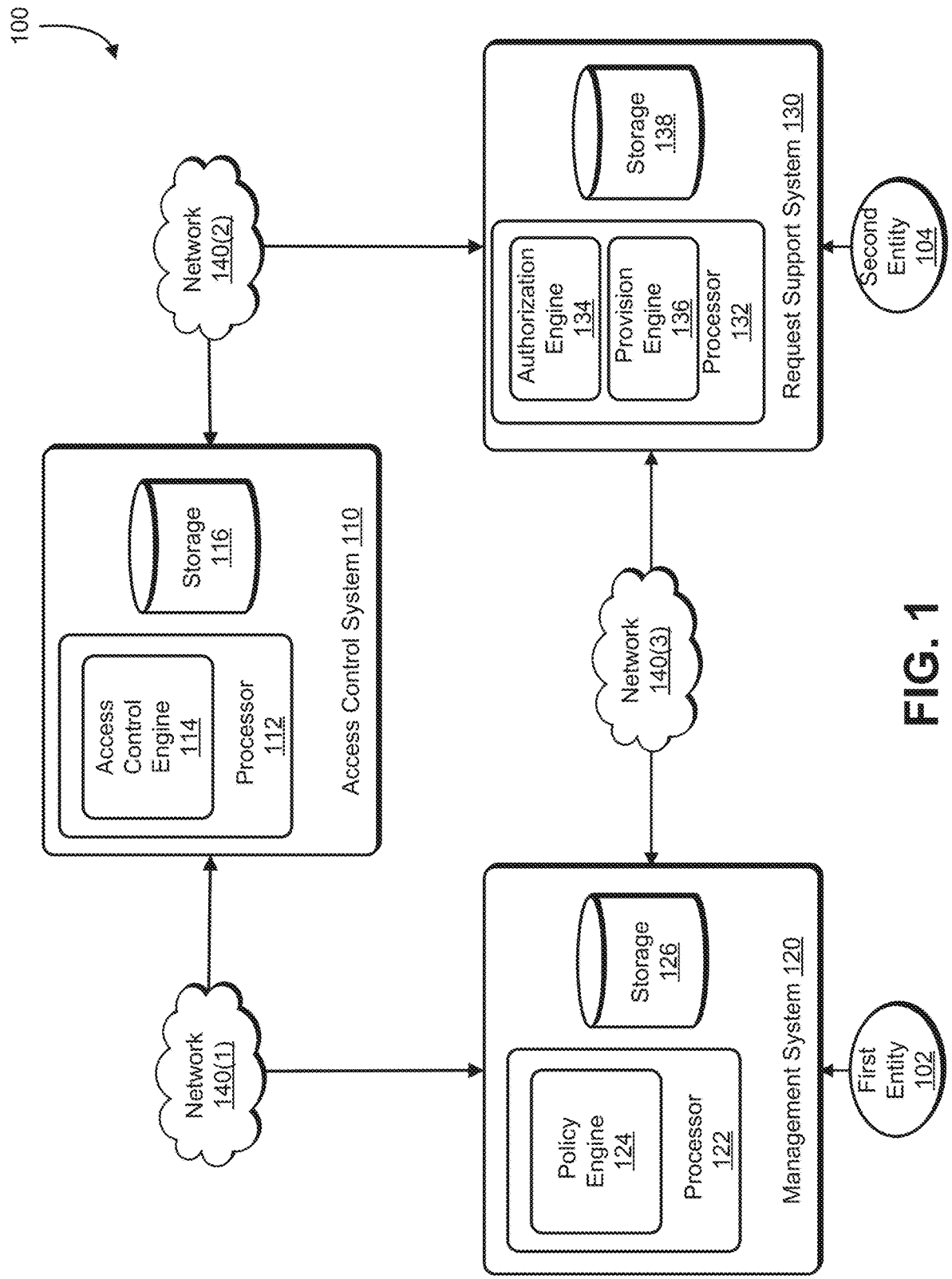
FIG. 1 illustrates an example of a system to perform access control management, in accordance with an embodiment.

The present application describes a system that may include one or more processors and one or more non-transitory, computer-readable mediums that may include instructions. The one or more processors may obtain from a storage device, that includes previous access permissions data associated with one or more computing resources, a plurality of attributes associated with the previous access permissions data and a plurality of roles associated with the previous access permissions data. The one or more processors may generate a first data structure indicating first correlations between attributes of the plurality of attributes; identify second correlations between the first data structure and the plurality of roles. The one or more processors may generate a second data structure indicating an association between at least one of plurality of attributes and at least one of plurality of roles based, at least in part, on the second correlations. The one or more processors may cause an access token representing access permissions to the one or more computing resources to be granted to a user, the access token being derived based, at least in part, using the second data structure.

Additionally, the one or more processors may generate a set of attributes and a set of roles for a user associated with the request based, at least in part, on the second data structure and information associated with the user; and provide the set of attributes and the set of roles to an entity associated with the user.

Moreover, the one or more processors may obtain an indication that a subset from the set of attributes is selected; and grant the access permissions for the user based, at least in part, on the subset, where the access permissions may include the access token usable to obtain the one or more computing resources. The one or more processors may record, in the storage device, information associated with the access permissions granted for the user. The one or more processors may update the second data structure based, at least in part, on a plurality of policies associated with the one or more computing resources.

According to another example of the present application, a method may include obtaining, from a storage device that includes previous access permissions data associated with one or more computing resources, a plurality of attributes may include attributes of different types. The method also includes generating a first data structure indicating first correlations between attributes of a first subset of the plurality of attributes The method also includes identifying, based, at least in part, on the previous access permissions data, second correlations between the first data structure and a second subset of the plurality of attributes. The method also includes generating a second data structure indicating an association between the attributes of different types based, at least in part, on the second correlations. The method may include in response to a request to access the one or more computing resources, providing one or more access tokens based, at least in part, on the second data structure.

Additionally, the second subset of the plurality of attributes may include one or more roles. The second data structure may include a directed acyclical graph (DAG). The second correlations can be identified using one or more neural networks. The one or more computing resources may include an application stack. The first subset of plurality of attributes is generated, at least in part, according to an attribute-based access control (ABAC) model; and the second subset of the plurality of attributes is generated, at least in part, according to a role-based access control (RBAC) model. The second subset of plurality of roles indicates at least one of: developer, information technology (IT) support, or application manager.

Moreover, the method may include identifying a role or an attribute that was generated in association with the one or more computing resources; and causing the role or the attribute to be approved by at least indicating the role or the attribute.

Another example of the present disclosure includes a non-transitory computer-readable storage medium that includes instructions. The instructions may include receiving, from a storage device that includes information associated with one or more computing resources, a plurality of attributes and a plurality of roles. The instructions may include generating a first data structure indicating first correlations between attributes of the plurality of attributes. The instructions may include determining, second correlations between the first data structure and the plurality of roles based, at least in part, on the information from the storage device. The instructions may include generating a second data structure indicating an association between at least one of plurality of attributes and at least one of plurality of roles based, at least in part, on the second correlations. The instructions may include as a result of receiving a request to access the one or more computing resources, causing one or more access tokens to be transmitted based, at least in part, on the second data structure.

Additionally, the instructions may include generate a set of attributes and roles for an entity that transmitted the request based, at least in part, on the second data structure and the information associated with the entity; and transmit the set of attributes and roles. The instructions may include receive a subset from the set of attributes and roles that is selected from the set of attributes and roles; and as a result of granting the subset to configure access permissions for the entity, cause one or more access tokens to be generated. The instructions may include receiving a subset from the set of attributes and roles that is selected from the set of attributes and roles, granting the subset to configure the access permissions for the entity, and providing one or more access tokens to access the computing resource.

Moreover, the second data structure may include a directed acyclical graph (DAG). The one or more computing resources may include an application stack. The plurality of attributes can be generated, at least in part, according to an attribute-based access control (ABAC) model, and the plurality of roles is generated, at least in part, according to a role-based access control (RBAC) model.

DETAILED DESCRIPTION

Techniques and systems described below relate to access control management. Systems of the present disclosure can use historical data (e.g., previous access information) to correlate attributes, roles, and access privileges such that, whenever there is a request for access privileges for a particular member (e.g., new hire such as a developer) of an organization, the systems can provision related access privileges for the member without requiring the member to send hundreds of requests to fulfill their responsibilities (e.g., design, develop, test, and maintain computer resources such as software applications).

In some examples, the systems may identify correlations between attributes, roles, and access privileges described throughout the present disclosure and generate data structure (e.g., directed acyclical graphs (DAGs)) that indicate the correlations. Attributes may refer to a characteristic or property, such as a user role, resource type, environment condition, data classification, group, or action, that is used to define and enforce access control policies. The attributes can be valuated against access control rules to determine whether a user or system entity is authorized to perform a specific action on a resource. In some examples, attributes may be at least one customizable trait with a name and value pair. The roles may refer to a representation of a group of access permissions, such as permissions associated with a particular job function or responsibility within an organization. Roles may be used to define access control policies, allowing users who are assigned specific roles to perform certain actions on resources based on the permissions associated with those roles. Previous access data of employees within an organization may refer to records or logs that capture details about when and how employees have accessed certain applications or systems, such as those used for software development. This data can include information about the duration of access, specific actions performed, and the level of permissions granted. Previous access data may capture the history of how different individuals or groups within an organization have accessed a specific project or application. For example, in a software development team, various members, such as developers, testers, and project managers, may have different levels of access based on their roles and responsibilities. Developers may have full access to the project's code repository, allowing them to commit changes and review code, while testers might only have access to run tests and report bugs. Project managers, on the other hand, might have access to project dashboards and documentation but not the code itself.

In various examples, the systems may generate data structures that indicate relationships between attributes and generate other data structure that indicate relationships between roles. The systems may identify connections between data structures (which indicate different relationships) based on historical access data. The systems may use neural networks (e.g., transformer networks) that include encoders that generate vectors that indicate roles, attributes, and computing resources and decoders that identify correlations between the roles, attributes, and computing resources using the vectors.

In some examples, the systems may receive requests to implement policies that defines groupings between attributes, roles, and access privileges. For example, scope of access privileges associated with a role may increase or decrease. Whenever there are changes in those, the system can update the correlations based on those changes. As a result, the systems may combine different access control models (e.g., attribute-based access control (ABAC) models, role-based access control (RBAC) models, policy-based access control models (PBAC)).

In some examples, the systems provide access permissions to members (e.g., employees) of an organization (e.g., company) who are working on a specific function or technology using a certain set of tools (e.g., code repository). For example, a developer who is a new hire or has transferred to a different department needs access to one or more tools to work on a new application. Attributes associated with the developer may include, for example, working from 9:00 AM to 5:00 PM, location (e.g., East Coast, Tampa), type of computing resource, type of project, position (e.g., full-time worker, contractor), etc.

The systems receive a request from the same member or other members (e.g., managers) who transmit requests on behalf of the member who needs access permissions to work on projects associated with computing resources. The system can provide the requestor with a list of attributes and roles that appear to be associated with the member who needs access permissions. The requestor can indicate, via a graphical user interface (GUI), a subset from the list to the systems. The systems can use the subset to provision access permissions for the member. After provisioning the access permissions of the user, the systems can store the history in storage such that the information can be used to update data structures that indicate correlations between roles, attributes, and access privileges. Additionally, the user can receive access tokens that enable them to request access to the computing resources. These tokens may allow the user to obtain the necessary computing resources.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of resource management and access control, by optimizing the utilization of computing resources, reducing idle times, and enhancing system performance through more efficient permission granting processes. Additionally, techniques described and suggested in the present disclosure improve the field of computing, especially the field of cybersecurity, by enhancing security through streamlined permission processes, reducing manual intervention, and minimizing the risk of unauthorized access.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

Any system or apparatus feature as described herein can include computer programs and computer program products comprising software code adapted, when executed on a data processing apparatus, to perform any of the methods and/or for embodying any of the apparatus and system features described herein, including any or all of the component steps of any method. Any system or apparatus feature as described herein can also include a computer or computing system (including networked or distributed systems) having an operating system that supports a computer program for carrying out any of the methods described herein and/or for embodying any of the apparatus or system features described herein. Any system or apparatus feature as described herein can also include a computer readable media having stored thereon any one or more of the computer programs aforesaid. Any system or apparatus feature as described herein can include a signal carrying any one or more of the computer programs aforesaid.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 1 illustrates an example of system 100 to perform access control management, in accordance with an embodiment. System 100 may include access first entity 102, second entity 104, access control system 110, management system 120, and request support system 130, and networks 140. In some examples, system 100 may include software implemented at one or more computing systems, which comprises computing device 1300 illustrated in FIG. 13. Alternatively, system 100 may refer to any combination of software logic, hardware logic, and circuitry described herein for software management.

In various examples, terms such as "software" described herein may include one or more of operating systems, device drivers, application software, database software, graphics software, web browsers, development software (e.g., integrated development environments, code editors, compilers, interpreters), network software, simulation software, real-time operating systems (RTOS), artificial intelligence software, robotics software, firmware (e.g., BIOS/UEFI, router, smartphone, consumer electronics, embedded systems, printer, solid state drive (SSD)), APIs, containerized software, container orchestration platform, algorithms, instructions, and any other implementation embodied as a software package, code and/or instruction set.

Terms such as "hardware" described herein may include one or more of central processing units (CPU), integrated circuit (IC), system on-chip (SoC), graphics processing unit (GPU), data processing unit (DPU), digital signal processor (DSP), tensor processing unit (TPU), accelerated processing unit (APU), application-specific integrated circuits (ASIC), intelligent processing unit (IPU), neural processing unit (NPU), smart network interface controller (SmartNIC), vision processing unit (VPU), field-programmable gate array (FPGA) hardwired circuitry, programmable circuitry, state machine circuitry, fixed function circuitry, execution unit circuitry, and/or firmware that stores instructions executed by programmable circuitry.

In at least one embodiment, system 110 may include a distributed system configured to efficiently handle large-scale data processing and service delivery. The distributed system may spread tasks across multiple interconnected servers to ensure that no single point of failure can disrupt the system's overall functionality. Each server, or node, in the distributed system can be responsible for a specific portion of the backend operations, such as data storage, processing, or handling client requests. By leveraging this setup, system 110 may handle increased demand by simply adding more nodes. Furthermore, the distributed system may improve fault tolerance and reliability by redistributing its tasks to other operational nodes in response to failure of at least one node. The distributed system may facilitate communication and coordination among nodes through one or more of algorithms and protocols to ensure data consistency and synchronization across system 110.

In at least one embodiment, access control system 110 may refer to one or more of hardware and software described herein to generate entitlement privilege correlations using data from multiple source systems and stage it. Access control system 110 may include processor 112, access control engine 114, and storage 116. Processor 112 may refer to a central unit within a device or system (e.g., access control system 110) that can execute instructions and perform calculations necessary to run software and process data. Processor 112 may include hardware (e.g., hardware accelerators or coprocessors) described herein. Processor 112 may include access control engine 114.

In at least one embodiment, access control engine 114 may refer to a module that identifies relationships between attributes, roles, and access privileges based, at least in part, on historical access data and any other information from an organization. Access control engine 114 may receive historical data from different systems associated with the organization. Access control engine 114 may identify correlations using the historical data by generating one or more data structures (e.g., DAGs) that indicate correlations between roles, attributes, and access privileges. For example, access control engine 114 may generate a first data structure that indicates associations between roles, a second data structure that indicates associations between attributes and use the historical data to identify one or more links between the first data structure and the second data structure. Access control engine 114 may use neural networks described herein to identify the correlations. Access control engine 114 may store data (e.g., staged data) including the data structures to storage 116. Access control engine 114 may aperiodically (e.g., per request) or periodically, identify any updates to the roles, attributes, access privileges, and computing resources to determine whether changes to the data structures need to be made.

In some examples, storages (e.g., storage 116, storage 126, storage 138) may refer to one or more hardware and software described herein to store, retrieve, and manage data, allowing information to be saved and accessed by one or more systems (e.g., access control system 110, management system 120, request support system 130). The storages may include one or more of random access memory (RAM), read-only memory (ROM), flash memory (e.g., Universal Serial Bus (USB) flash drives, SSD, memory cards), cache memory, hard disk drives (HDDs), virtual memory, graphics memory, optical discs, network attached storage (NAS), cloud storage, tape storage, etc. Additionally, the storages may further include one or more of relational databases, NoSqL databases, Key-Value stores, Document-oriented databases, column-family stores, and graph databases. In addition, the storages may also include one or more of code repositories, artifact repositories, content repositories, document repositories, package repositories, etc. And also, the storages may include one or more of file storage (e.g., network attached storage (NAS), cloud storage service), block storage, object storage, cache storage, tape storage, etc.

In at least one embodiment, roles within an organization (e.g., company) may include, technical roles such as software developer, DevOps engineer, cloud engineer, cybersecurity analyst, database administrator, data analysist, technical support specialist, network engineer, systems engineer, machine learning engineer, web developer, UX/UI designer etc. Additionally, other roles within the organization may include, for example, chief executive officer (CEO), chief operating officer (COO), chief financial officer (CFO), chief technology officer (CTO), chief marketing officer (CMO), general manager, department manager, project manager, operations manager, product manager, graphic designer, content writer, marketing specialist, sales representative, account manager, customer support specialist, business development manager, sales analysis, recruitment specialist, payroll administrator, benefits manager, accountant, financial analyst, controller, auditor, budget analyst, supply chain manager, logistic coordinator, quality assurance specialist, procurement officer, facilities manager, corporate lawyer, paralegal, compliance officer, contract manager, legal assistant, executive assistant, office manager, administrative assistant, receptionist, etc.

In at least one embodiment, management system 120 may refer to one or more of hardware and software described herein to modify attributes, roles, privileges using one or more policies. Management system 120 may include processor 122, access control engine 112, and storage 126. Processor 122 may refer to a central unit within a device or system (e.g., management system 120) that can execute instructions and perform calculations necessary to run software and process data. Processor 122 may include hardware (e.g., hardware accelerators or coprocessors) described herein. Processor 122 may include policy engine 124.

In at least one embodiment, first entity 102 may refer to a member of a governance team within an organization, which can act as a central body responsible for overseeing and managing key aspects such as attributes, roles, access permissions, and policies across the organization. This team may consist of security analysts, IT administrators, computing resource owners, managers within the organization, and compliance officers who can collaboratively ensure that access controls align with organizational policies and regulatory requirements. First entity 102 may utilize a suite of computing devices and secure platforms to communicate with various systems, including, management system 120 or any other identity management services, cloud infrastructures, and internal databases. Through these devices, first entity 102 can monitor, update, and enforce governance policies, ensuring that all members of the organization have the appropriate access rights in accordance with their roles and responsibilities.

In at least one embodiment, policy engine 124 may refer to a module that updates roles, attributes, and access privileges using at least one or more policies within the organization. The one or more policies may include one or more instructions or definitions to indicate what attributes can be related to a particular role. The one or more policies may modify the definition or values of individual roles and attributes. The one or more policies may modify the groupings (e.g., what are the scope of roles and attributes). The one or more policies may introduce new roles. In some examples, policy engine 124 may receive application programming interface (API) calls from first entity 102 to implement the one or more policies, where the API is described further in conjunction with FIG. 12. In some examples, policy engine 124 may handle new roles or attributes associated with one or more new computing resources that are associated with an organization. For example, if there is a project to develop a new software application, new roles and attributes can be brought out by first entity 102, which includes the owner of the new software application. There can be other entities within the organization that manages the roles and attributes associated with the new software application that interacts with policy engine 124.

In at least one embodiment, request support system 130 may refer to one or more of hardware and software described herein to handle requests to grant one or more access privileges for one or more entities within an organization. Request support system 130 may include processor 112, access control engine 114, and storage 116. Processor 132 may refer to a central unit within a device or system (e.g., request support system 130) that can execute instructions and perform calculations necessary to run software and process data. Processor 132 may include hardware (e.g., hardware accelerators or coprocessors) described herein. Processor 132 may include authorization engine 134 and provision engine 136.

In at least one embodiment, authorization engine 134 may refer to a module that handles requests for access privileges and other requests for new attributes and roles. Authorization engine 134 may receive requests from second entity 104 to provide access permissions for a particular member. After receiving the requests, authorization engine 134 may transmit to access control engine 110 information associated with the member and request to generate the list of attributes and roles that appear to be relevant to the member. The list may contain relevance data (e.g., probabilities, color codes) to indicate how relevant the attribute/role is to the member. Access control engine 110 may generate the list and transmit it back to authorization engine 134. Authorization engine 134 may forward or display the list to second entity 104. Second entity 104 may submit a subset from the list to authorization engine 134. Authorization engine 134 may submit the subset to the approving entity for approval. After receiving an indication that the subset is approved, authorization engine 134 may transmit the subset to provision engine 136.

In at least one embodiment, provision engine 136 may refer to a module that provisions access privileges for one or more entities of an organization. After receiving the subset from authorization engine 134, provision engine 136 may communicate (e.g., via one or more APIs) with access control engine 110 to receive information associated with the subset. Provision engine 136 may identify one or more policies to ensure that the access permissions that are associated with the list are consistent with the one or more policies before provisioning access privileges. In some examples, provision engine 136 may monitor changes to the members of the organization and provision one or more access privileges if provision engine 136 determines that it is 100% (or close) that access privileges are needed for the members without authorization engine 134 receiving a request from members of the organization.

In at least one embodiment, second entity 104 may refer to managers or their delegates within an organization (e.g., company) who can request access privileges on behalf of other members (e.g., customer support, trainer, developer, IT support, etc.) of the organization. These managers may be responsible for ensuring that their team members can obtain the necessary access to systems, applications, and resources required for their roles. They can utilize computing devices to interface with request support system 130, making access requests and tracking approvals. These devices may also allow them to communicate with IT administrators and other stakeholders to expedite or escalate access requests as needed.

In at least one embodiment, second entity 104 may further refer to members within an organization, such as new hires, transferred employees, contractors, interns, promoted employees, team members from other projects, new remote employees or part-time employees, who can request access privileges for themselves to work on projects associated with computing resources like application stacks. These members may need to ensure that they have the necessary permissions to access specific tools, databases, or platforms required for their tasks. They can use computing devices to submit access requests, track the status of these requests, and communicate with request support system 130 to resolve any access-related issues.

In at least one embodiment, networks (e.g., network 140(1), network 140(2), network 140(3)) may refer to one or more devices that facilitate communication by connecting various systems (e.g., access control system 110, management system 120, request support system 130) or additional devices, such as such as computers, servers, and mobile devices, to enable exchange of data. These networks can be implemented using various communication mediums, including wired connections like Ethernet cables or wireless technologies like Wi-Fi and cellular networks. They may utilize standardized communication protocols, such as TCP/IP, to ensure that data is transmitted accurately and reliably between devices. Networks can be configured in different topologies, such as star, mesh, or ring, to optimize performance and meet specific operational requirements.

In some examples, the networks may support various forms of data exchange, such as packet switching, which breaks data into packets for efficient transmission, or circuit switching, which establishes a dedicated communication path. The networks can include routing and switching devices to manage the flow of data, ensuring that it reaches the correct destination. Additionally, the networks may incorporate network security protocols, such as encryption and firewalls, to control access and protect data during transmission.

In at least one embodiment, each system (e.g., access control system 110, management system 120, request support system 130) may use one or more neural networks or any other machine learning models to perform tasks. The one or more neural networks may include, for example, convolutional neural networks (CNNs), recurrent neural networks (RNNs), long short-term memory (LSTM) networks, generative adversarial networks (GANs), autoencoders, transformer networks (e.g., bidirectional encoder representations from transformers (BERT), generative pre-trained transformer (GPT), text-to-text transfer transformer (T5), vision transformers (ViT), XLNet, etc.), feedforward neural networks, etc. The one or more neural networks can be trained using training framework 804 within system 800 illustrated in FIG. 8. Alternatively, the one or more neural networks may include pre-trained neural networks. Example tasks for inferencing may include the access control system identifying relationships between attributes, roles, and policies by using historical access data or the attributes, roles, and policies as inputs. Another task may include generating a list of relevant attributes and roles for an entity for second entity 104 to select based on information of the entity (e.g., personal information). Examples of inputs to be used for inferencing can be prompts, where prompts may refer to an input or initial context provided to the neural network to guide its generation or prediction process.

In some examples, the one or more neural networks (e.g., neural networks used by access control system 110) can include an encoder to encode responsibilities of members within an organization and a decoder to indicate additional attributes and/or group of attributes. The one or more neural networks may generate one or more vectors (e.g., three), where a first vector indicates responsibilities of individual members, and a second vector indicates responsibilities of other members that are related to the individual members. As a result, responsibilities can be distributed to different members of the organization.

In other examples, the one or more neural networks (e.g., neural networks used by access control system 110) generate indications of groups of members that are related and groups of responsibilities to determine correlations between attributes, roles, and responsibilities. To determine the correlations, the one or more neural networks may include, for example, an encoder that encodes all roles, attributes, and responsibilities to one or more vectors and a decoder that determines the correlations based on the one or more vectors.

Figure 2:
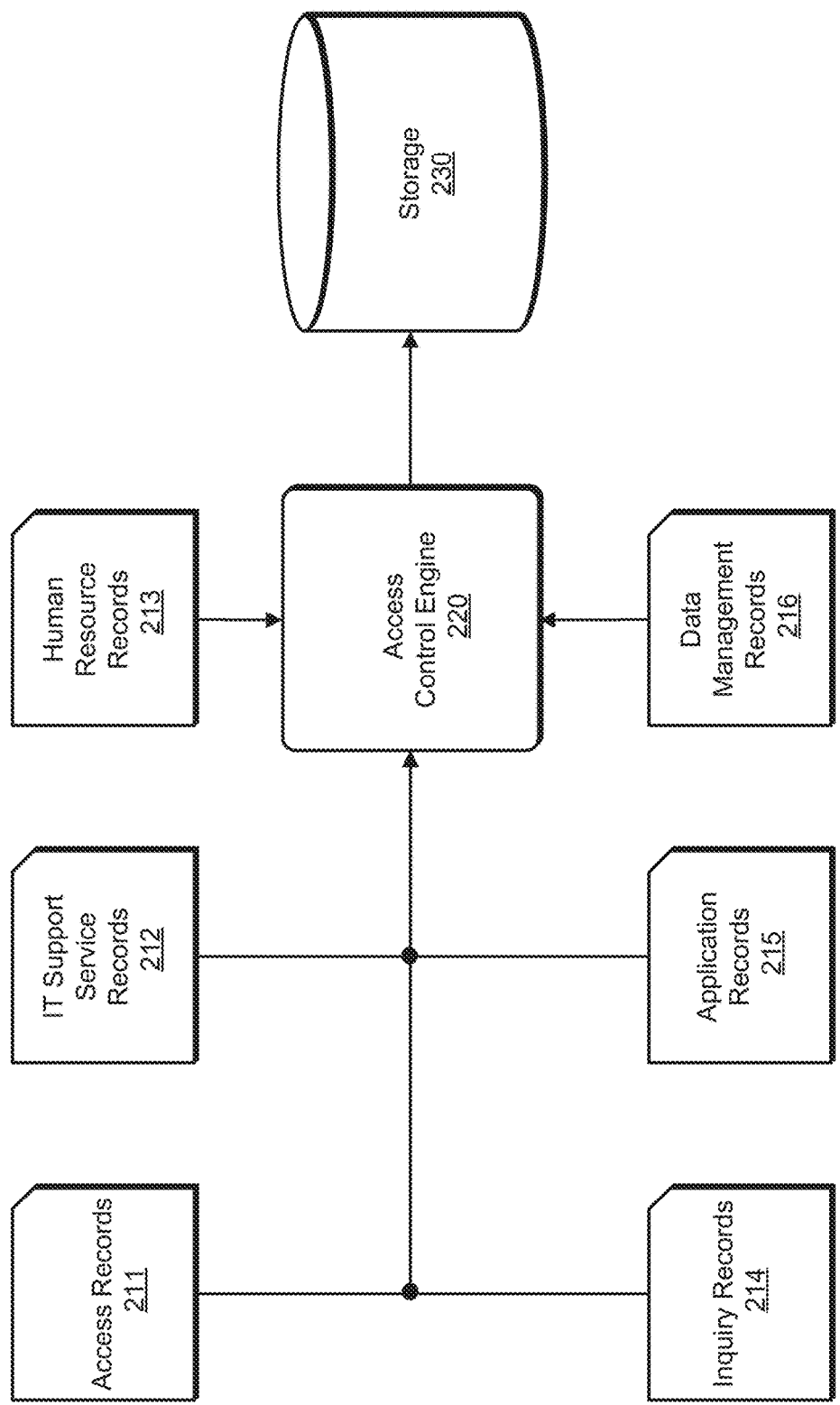
FIG. 2 illustrates an example of a system to identify associations between attributes and roles, in accordance with an embodiment.

FIG. 2 illustrates an example of system 200 to identify associations between attributes and roles, in accordance with an embodiment. In some examples, system 200 can be part of system 100 illustrated in FIG. 1. System 200 may include access control engine 220 and storage 230.

In at least one embodiment, access control engine 220 may refer to one or more of hardware and software described in conjunction with FIG. 1 to generate entitlement privilege correlations using data from multiple source systems and stage it. In some examples, access control engine 220 can be part of access control system 110 illustrated in FIG. 1. Also, access control engine 220 can include access control engine 330 illustrated in FIG. 3 and/or access control engine 430 illustrated in FIG. 4.

In various examples, access control engine 220 may receive historical data of an organization from different sources (e.g., access records 211, IT service records 212, human resource records 213, inquiry records 214, application records 215, data management records 216). Access records 211 may refer to information on how members within the organization obtained access privileges for computing resources while having some attributes and roles. IT support service records 212 indicate information (e.g., personas, groups, configuration items) generated as a result of in-house or third-party IT support software (e.g., IT service management, IT operation management, IT business management, IT asset management). Human resource records 213 indicate documentation of employee information, including personal details (e.g., location, department, etc.), employment history, performance evaluations, and role-specific responsibilities. Inquiry records 214 may indicate prior records of requests for access privileges on behalf of one or more members. Inquiry records 214 may include what access privileges the one or more members obtained as a result of submitting the requests. Inquiry records 214 may expand to information related to requests made by others that are related (e.g., within the same team). Application records 215 may refer to any kind of information (e.g., owner, interface, sector, host, identifiers) related to a computing resource. Application records 215 may include detailed documentation of the technologies, frameworks, and tools used across various roles.

In at least one embodiment, access control engine 220 may use the historical data to determine associations between roles, attributes, access privileges, and computing resources. Access control engine 220 may generate one or more data structures that indicate the associations. Access control engine 220 may generate associations between the one or more data structures. The collected data from various sources (e.g., access records 211, IT service records 212, human resource records 213, inquiry records 214, application records 215, data management records 216), associations, and the data structures can be stored in storage 230.

In some examples, storage 230 may refer to one or more hardware and software described in conjunction with FIG. 1 to store, retrieve, and manage data, allowing information to be saved and accessed by one or more systems (e.g., access control engine). Storage 230 may include one or more storages described in conjunction with FIG. 1.

In other examples, access control engine 220 may use one or more neural networks or other machine learning models further described in conjunction with FIG. 1 to infer correlations between roles, attributes, and other historical access data associated with one or more organizations. The one or more neural networks may include pre-trained neural networks (e.g., BERT, GPT, etc.) that perform natural language processing. The one or more neural networks may receive prompts that indicate the roles, attributes, or other historical access data as inputs to infer the correlations. Access control engine 220 may utilize one or more hardware accelerators, such as, for example, GPUs, FPGAs, ASICs, TPUs, NPUs, DSPs, etc., to perform neural network inferencing and/or training.

Figure 3:
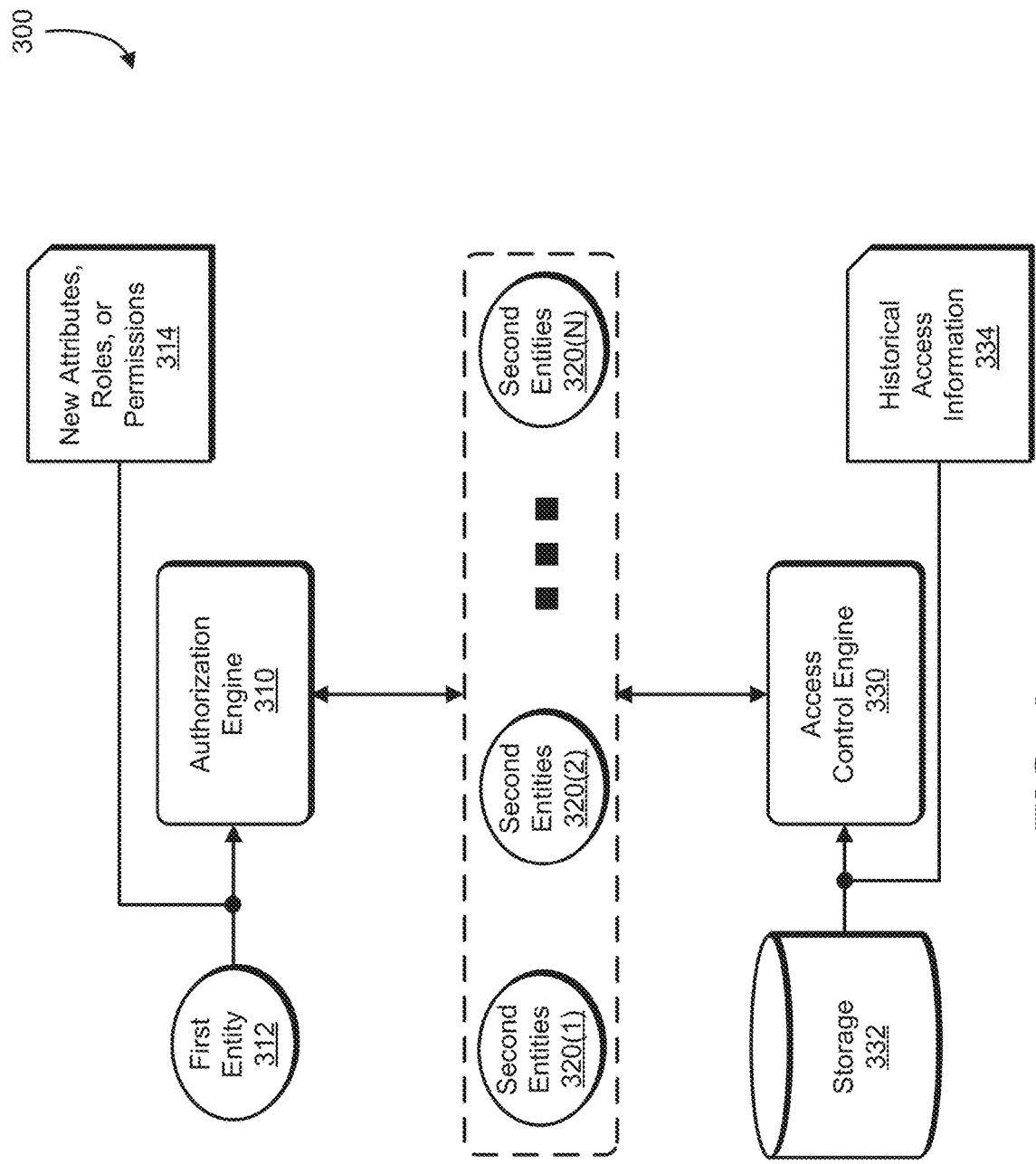
FIG. 3 illustrates an example of a system to modify attributes and roles, in accordance with an embodiment.

FIG. 3 illustrates an example of system 300 to modify attributes and roles, in accordance with an embodiment. In some examples, system 300 can be part of system 100 illustrated in FIG. 1. System 300 may include authorization engine 310, access control engine 330, and storage 332.

In at least one embodiment, authorization engine 310 may refer to one or more of hardware and software described in conjunction with FIG. 1 to handle requests for access privileges and other requests for new attributes and roles. In some examples, authorization engine 310 can be part of authorization engine 134 illustrated in FIG. 1. Also, authorization engine 310 may include authorization engine 420 illustrated in FIG. 4.

In at least one embodiment, second entities (e.g., second entities 320(1), second entities 320(2) . . . second entities 320(N)) may refer to members of a governance team within an organization, which can act as a central body responsible for overseeing and managing key aspects such as attributes, roles, access permissions, and policies across the organization. This team may consist of security analysts, IT administrators, computing resource owners, managers within the organization, and compliance officers who can collaboratively ensure that access controls align with organizational policies and regulatory requirements. First entity 102 may utilize a suite of computing devices and secure platforms to communicate with various systems, including, authorization engine 310, access control engine 330 or any other identity management services, cloud infrastructures, and internal databases. Through these devices, the second entities can monitor, update, and enforce governance policies, ensuring that all members of the organization have the appropriate access rights in accordance with their roles and responsibilities. In some examples, second entities may include first entity 102 illustrated in FIG. 1.

In some examples, first entity 312 may refer to computing resource owners or engineers that generate new attributes, roles, or permissions related to a new computing resource 314. In response, authorization engine 310 sends information to second entities (e.g., second entities 320(1), second entities 320(2) . . . second entities 320(N)). The second entities may modify the new attributes, roles, or permissions related to a new computing resource 314 by applying one or more policies. For example, the definition of some roles can be changed. In another example, the scope of new attributes can be changed. Also, additional attributes, roles, or permissions related to a new computing resource 314 can be added by the second entities. The second entities may interact with access control engine 330 to receive historical access information 334 to make the modification. Historical access information 334 may include access records 211, IT service records 212, human resource records 213, inquiry records 214, application records 215, and data management records 216 (illustrated in FIG. 2).

The one or more policies that the second entities may include definitions or instructions to cause access control engine 330 to redefine correlations between roles, attributes, access permissions, and computing resources.

In at least one embodiment, access control engine 330 may refer to one or more of hardware and software described in conjunction with FIG. 1 to identify relationships between attributes, roles, and access privileges based, at least in part, on historical access data and any other information from an organization. In some examples, access control engine 330 can be part of access control system 110 illustrated in FIG.

1. Also, access control engine 330 can include access control engine 220 illustrated in FIG. 2 and/or access control engine 430 illustrated in FIG. 4.

In some examples, storage 332 may refer to one or more hardware and software described in conjunction with FIG. 1 to store, retrieve, and manage data, allowing information to be saved and accessed by one or more systems (e.g., access control engine). Storage 332 may include one or more storages described in conjunction with FIG. 1.

Figure 4:
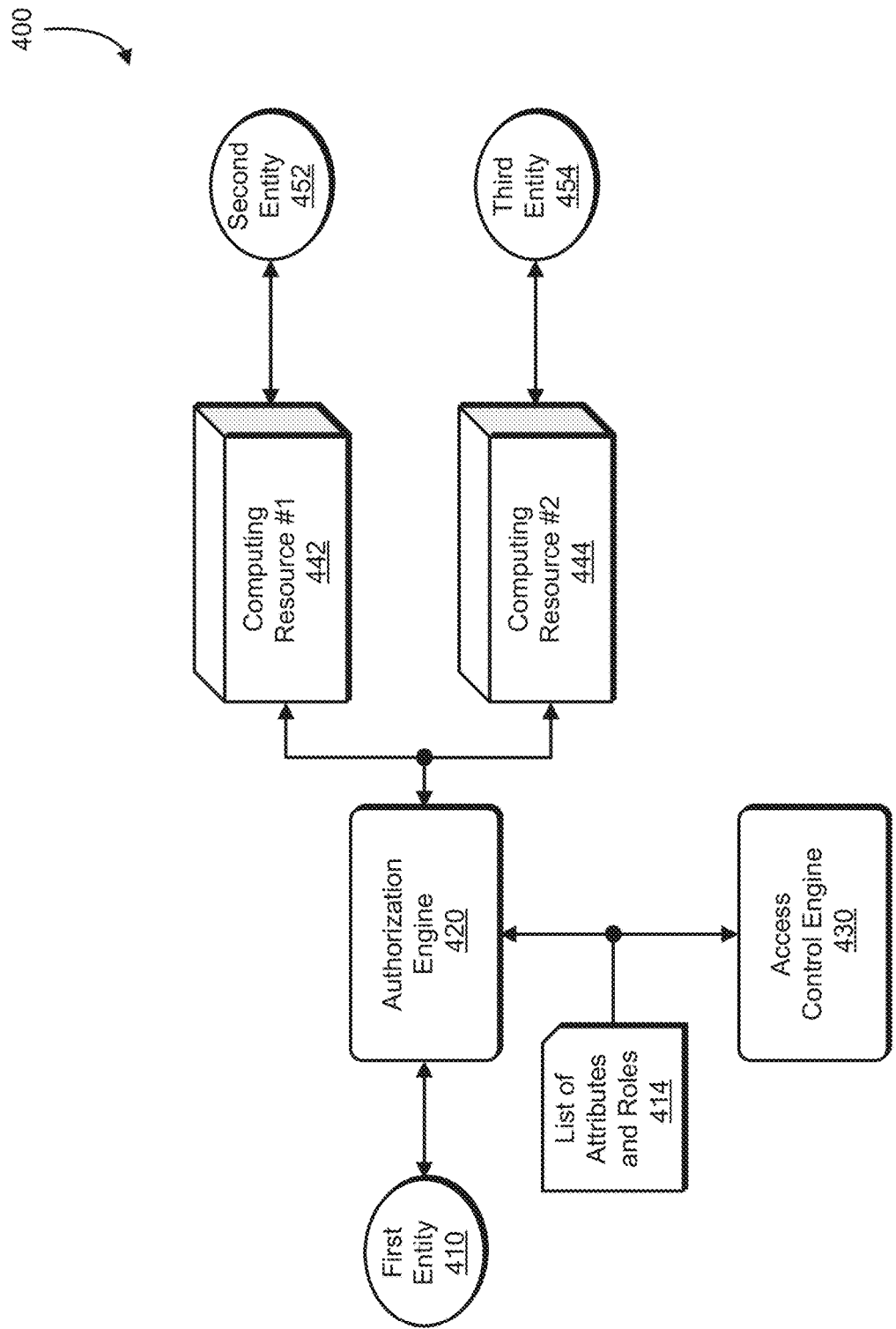
FIG. 4 illustrates an example of a system to provision access permissions, in accordance with an embodiment.

FIG. 4 illustrates an example of system 400 to provision access permissions, in accordance with an embodiment. In some examples, system 400 can be part of system 100 illustrated in FIG. 1. System 400 may include authorization engine 420 and access control engine 430.

In at least one embodiment, first entity 410 may refer to managers within an organization who can request access privileges on behalf of other members (e.g., second entity 452, third entity 454). These managers may be responsible for ensuring that their team members can obtain the necessary access to systems, applications, and resources required for their roles. They can utilize computing devices to interface with authorization engine 420, making access requests and tracking approvals. These devices may also allow them to communicate with IT administrators and other stakeholders to expedite or escalate access requests as needed. First entity 410 may include second entity 104 illustrated in FIG. 1.

In at least one embodiment, first entity 410 may further refer to members (e.g., second entity 452, third entity 454) within an organization, such as new hires, who can request access privileges for themselves to work on projects associated with computing resources like application stacks. These members may need to ensure that they have the necessary permissions to access specific tools, databases, or platforms required for their tasks. They can use computing devices to submit access requests, track the status of these requests, and communicate with authorization engine 420 to resolve any access-related issues. In some examples, first entity 410 can be either second entity 452 or third entity 454.

In at least one embodiment, authorization engine 420 may refer to one or more of hardware and software described in conjunction with FIG. 1 to handle requests for access privileges and other requests for new attributes and roles. In some examples, authorization engine 420 can be part of authorization engine 134 illustrated in FIG. 1. Also, authorization engine 420 may include authorization engine 310 illustrated in FIG. 3.

In some examples, first entity 410 may transmit requests for a member (e.g., new hire, transferred member) such that the member can obtain access privileges associated with computing resources (e.g., computing resource #1 442, computing resource #2 444). Authorization engine 420 may send a request to access control engine 430 to obtain a list of attributes and roles 414 that appear to be relevant to the member. Access control engine 430 may receive information associated with the member to generate the list of attributes and roles 414 by identifying matching attributes, roles, access privileges and the computing resources. The list of attributes and roles 414 may include indicators (e.g., color codes, percentages) that show how attributes, roles, and computing resources that appear to be relevant to the member. First entity 410 may select a subset in response to receiving list of attributes and roles 414 and send it to authorization engine 420. The subset may include indications of relevant computing resources to the member. Authorization engine 420 may interact with other entities (e.g., provision engine 1108 illustrated in FIG. 11) to provision access privileges based on the subset. Authorization engine 420 may receive additional information associated with the subset from access control engine 430 to provision the access privileges.

In at least one embodiment, access control engine 430 may refer to one or more of hardware and software described in conjunction with FIG. 1 to identify relationships between attributes, roles, and access privileges based, at least in part, on historical access data and any other information from an organization. In some examples, access control engine 430 can be part of access control system 110 illustrated in FIG. 1. Also, access control engine 430 can include access control engine 330 illustrated in FIG. 3 and/or access control engine 220 illustrated in FIG. 2.

In at least one embodiment, second entity 452 can be a member (e.g., new hire, transferred employee) of an organization that needs access permissions to work on one or more projects related to computing resource #1 442. After receiving access permissions associated with computing resource #1 442, second entity 452 can log into the organization's network or platform using their credentials. Second entity 452 can utilize tools like Secure Shell or VPN for secure access and may need to launch or configure certain components of computing resource #1 442 as required. After setup, second entity 452 can begin working on their project, utilizing the granted resources, and making any necessary adjustments as the project progresses. As a result, different entities (e.g., second entity 452, third entity 454) may have access to computing resources (e.g., computing resource #1 442, computing resource #2 444).

In at least one embodiment, computing resource #1 442 may refer to any hardware, software, or network infrastructure component that provides the necessary capabilities for performing computing tasks, including processing power, memory, storage, and connectivity. Examples of hardware and software are further described in conjunction with FIG. 1. Computing resource #1 442 may include, for example, e-mail account, communication platforms (e.g., Zoom, MS Teams, Slack), orchestration tools (e.g., Docker), orchestration systems (e.g., Kubernetes), webserver (e.g., Nginx), version control systems (e.g., Git), continuous integration/deployment pipelines, database system (e.g., MySQL, PostgreSQL, MongoDB), frontend framework (e.g., React, Angular), backend server (e.g., Node.js, Django), API tools (e.g., Postman), project management and development tool (e.g., Jira), text editors (e.g., Visual Studio Code), operating systems (e.g., Windows, MacOS, Linux), productivity tools (e.g., MS Office, Google Workspace, Adobe Creative Cloud), web browsers, specialized software (e.g., MATLAB, QuickBooks, AutoCAD), computing instances, virtual machines, serverless computing platforms, storage resources (e.g., block storage, object storage), virtual private clouds, content delivery networks, machine learning platforms, etc.

In at least one embodiment, third entity 454 can be a member (e.g., new hire, transferred member) of an organization that needs access permissions to work on one or more projects related to computing resource #2 444. After receiving access permissions associated with computing resource #2 444, third entity 454 can log into the organization's network or platform using their credentials. Third entity 454 can utilize tools like Secure Shell or VPN for secure access and may need to launch or configure certain components of computing resource #2 444 as required. After setup, third entity 454 can begin working on their project, utilizing the granted resources, and making any necessary adjustments as the project progresses.

In at least one embodiment, computing resource #2 444 may refer to any hardware, software, or network infrastructure component that provides the necessary capabilities for performing computing tasks, including processing power, memory, storage, and connectivity. Examples of hardware and software are further described in conjunction with FIG. 1. Computing resource #2 444 can be either identical to, or different from. computer resource #1 442.

Figure 5:
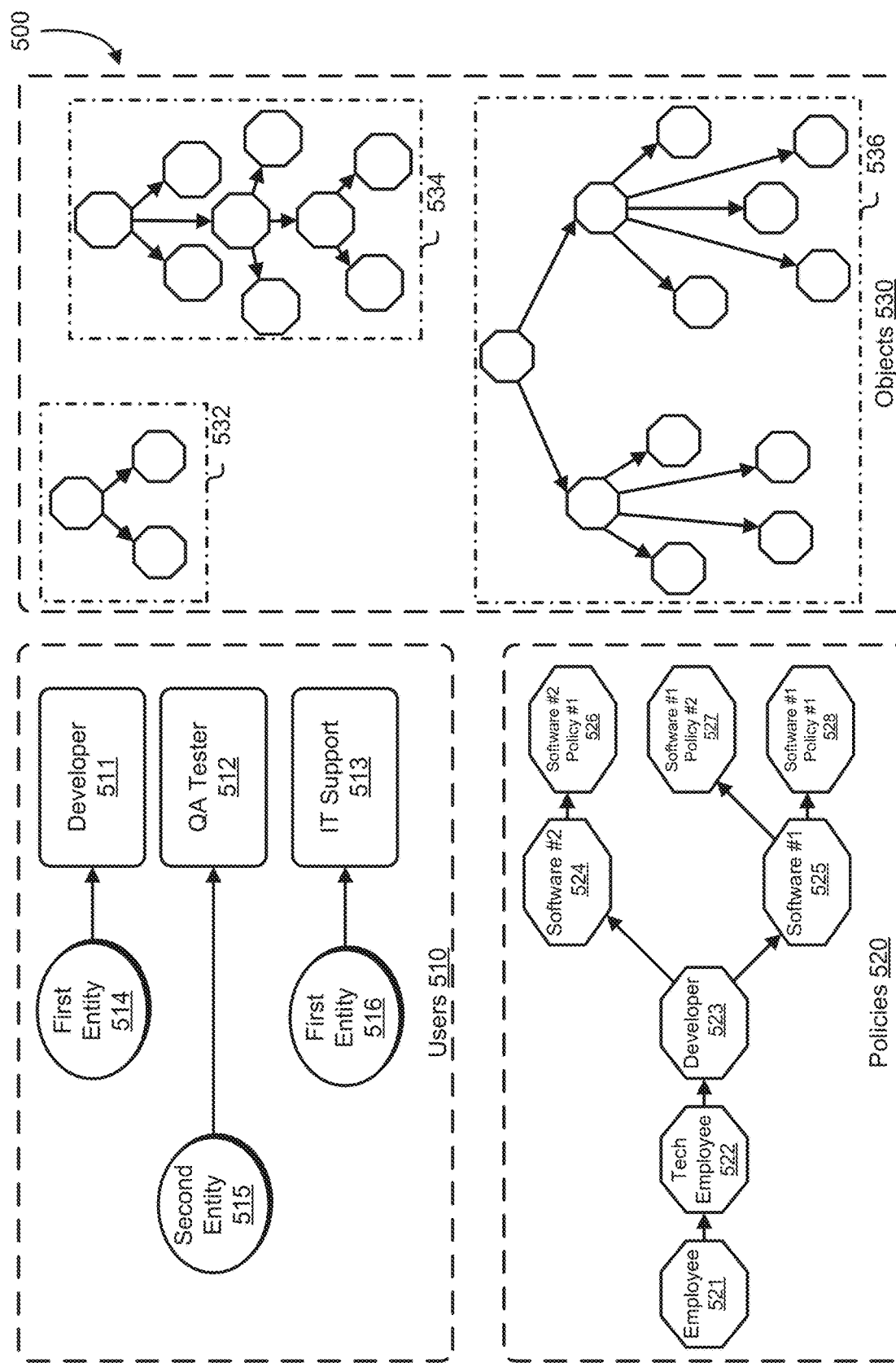
FIG. 5 illustrates an example of a data model for access control management, in accordance with an embodiment.

FIG. 5 illustrates an example of data model 500 for access control management, in accordance with an embodiment. Data model is a combination of at least two distinct models, which are attribute based access control (ABAC) model and role-based access control (RBAC) model.

ABAC model may refer to a type of access control system where decisions on granting or denying access to resources can be based on attributes associated with users, resources, and the environment. These attributes can include user characteristics like role, department, or clearance level, as well as resource properties such as classification and environmental factors like time of access or location. The ABAC model may evaluate these attributes against predefined policies to determine whether access should be permitted, enabling a highly granular and flexible approach to access control. In an ABAC model, access control policies can be dynamically generated based on the combination of various attributes, allowing for real-time decision-making that reflects the current context. This model may integrate with different systems and applications, supporting a broad range of access scenarios across diverse environments. As attributes and policies can be continuously updated, the ABAC model can adapt to changing security needs, ensuring that access control remains responsive to evolving organizational requirements. This flexibility can make ABAC particularly suited for complex environments where access decisions must consider multiple variables.

Examples of attributes of an ABAC model can include, for example, user attributes like role, department, and clearance level. A user's role may determine what resources they can access, while their department can further refine those permissions to specific functions within the organization. Additionally, attributes such as a user's location or time of access can influence whether access is granted, with certain resources being available only during work hours or from specific geographical locations. These user-centric attributes can be dynamically evaluated to ensure that access control decisions are both context-aware and aligned with organizational policies. Additionally, resource attributes can include factors like classification, type, and ownership. Environmental attributes may include the time of access, the location of the user, and the security status of the network or device being used. These attributes can be combined with user attributes to create complex, nuanced access control policies within an ABAC model. Attributes may include querying active directory and grouping members based on the information.

RBAC model may refer to a type of access control system where permissions to access resources (e.g., computing resources) can be assigned based on the roles that users hold within an organization. In this model, roles may represent specific job functions or responsibilities, and each role can have predefined access rights to certain resources. Users can be assigned one or more roles, and their access to resources may be determined by the permissions associated with those roles. This approach can simplify the management of access control by allowing administrators to assign roles rather than managing individual user permissions directly.

In an RBAC model, roles can be designed to reflect the hierarchical structure of an organization, where higher-level roles may inherit the permissions of lower-level roles. The model may also support the segregation of duties, ensuring that no single role can access all resources or perform all critical actions. RBAC can be particularly effective in environments where users' responsibilities are clearly defined, allowing for consistent and efficient access control management.

Examples of roles in an RBAC model can include, for example, roles such as Administrator, Manager, and Employee. An Administrator role may have permissions to manage user accounts, configure system settings, and access all resources. A Manager role can include permissions to approve requests, generate reports, and access departmental data. An Employee role may be limited to basic access such as viewing and editing their own records or accessing shared resources within their team. Additional roles can include roles like HR Specialist, IT Support, and Auditor. An HR Specialist role may have access to employee records, manage payroll, and handle recruitment processes. IT Support can include permissions to troubleshoot technical issues, manage hardware, and provide user support. An Auditor role may be granted read-only access to financial records, compliance reports, and other sensitive data for review purposes. These roles can be tailored to fit the specific needs of an organization, ensuring that users have access only to the resources necessary for their job functions.

In some examples, different entities (e.g., first entity 514, second entity 515, third entity 516) can correspond to different roles (e.g., developer 511, QA tester 512, IT support 513), as shown in a group of users 510. Each role can be associated with different attributes. For example, the developer 511 role can be correlated to one or more nodes of first object graph 532, second object graph 534, and third object graph 536 of a group of objects 530, whereas other roles may not be correlated to the nodes.

In other examples, a group of policies 520 indicate different access permissions that can be applied to different roles. For example, access privileges can be different depending on the node. Specifically, roles with broader definitions (e.g., employee 521, tech employee 522) may have more access privileges compared to roles with narrower definitions (e.g., developer 523). Different entities (e.g., second entities 320 illustrated in FIG. 3) can define different roles in various hierarchies. In one example, there are entities which define broader scopes or definitions and there are other entities which define narrower scopes or definitions. The entities may use one or more APIs to define the roles and group the roles.

In some examples, developer 523 can be associated with different software (e.g., software #2 524, software #1 525) that are involved in. Even within each software, there could be different software policies (e.g., software #2 policy #1 526 for software #2, software #1 policy #1 528 and software #1 policy #2 527 for software #1). Software can include, for example, BitBucket, Jira, Jenkins, etc.

Figure 6:
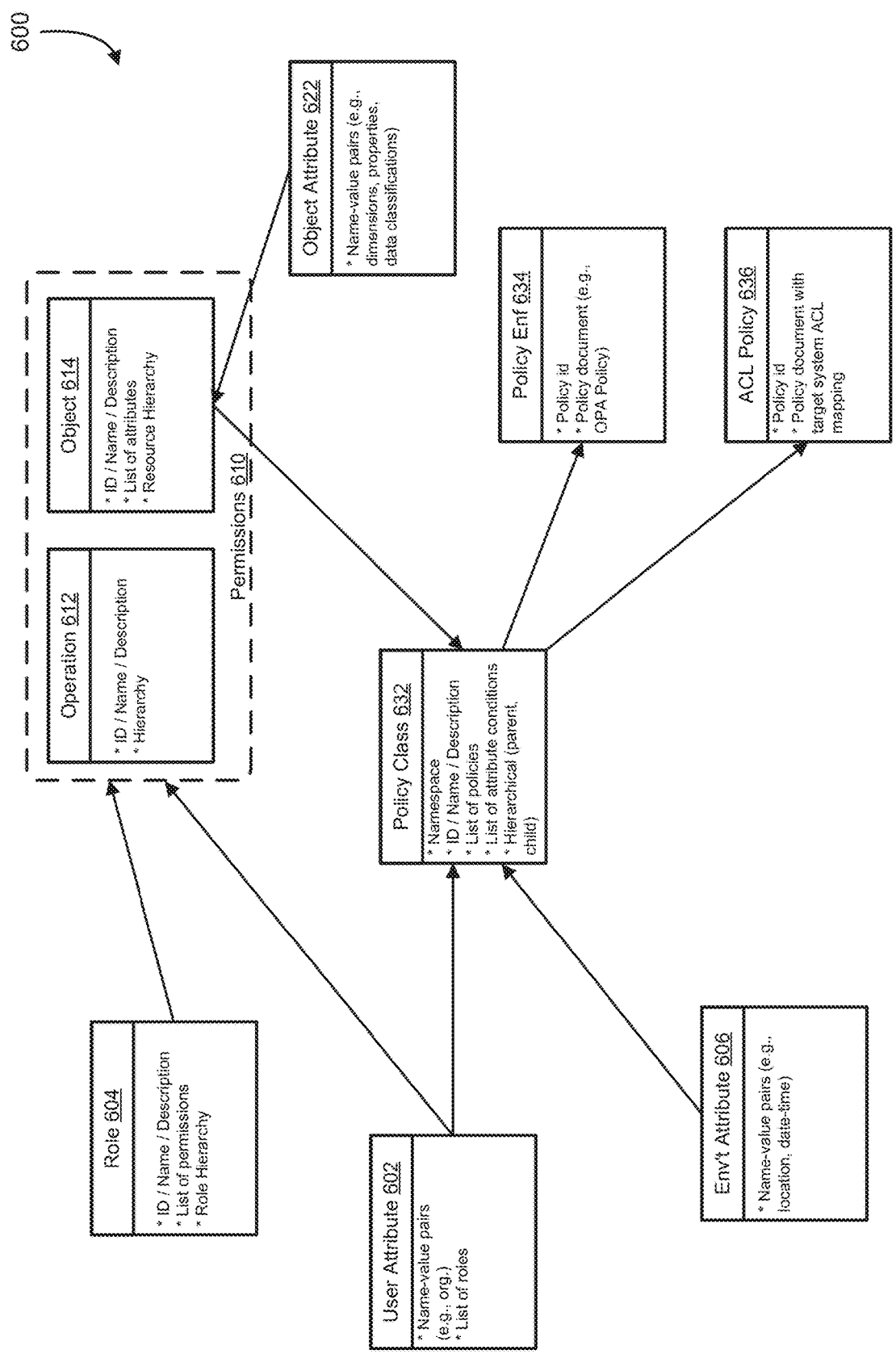
FIG. 6 is another example of a data model for access control management, in accordance with an embodiment.

FIG. 6 is another example of data model 600 for access control management, in accordance with an embodiment. Data model 600 is a combination of at least two distinct models, which are attribute based access control (ABAC) model and role-based access control (RBAC) model. ABAC model and RBAC model are further described in conjunction with FIG. 5.

In at least one embodiment, data model 600 comprises connections of attributes (e.g., user attribute 602, environment attribute 606, object attribute 622), roles (e.g., role 604), policies (e.g., policy class 632, policy enforcement 634, access control list (ACL) policy 636), and access permissions (e.g., operation 612, object 614). In some examples, user attributes (e.g., user attribute 602) may refer to a specific characteristic or property associated with a user that can be used to make decisions about what resources the user can access and what actions they can perform. User attributes may include, for example, department, groups, (e.g., support group or development group), peers, clearance level, job title, employment status (e.g., full-time, part-time, contractor, intern), user identification, group membership, etc. Environment attributes (e.g., environment attribute 606) may refer to contextual information about the environment in which an access request is made. Examples of environment attributes may include, for example, time of day, date or day of the week, location (e.g., geographical or network), device security status (e.g., VPN), network type (e.g., private or public Wi-Fi), authentication strength (e.g., multi-factor, single-factor), risk level, weather, compliance status, etc. Object attributes (e.g., object attribute 622) may refer to different computing resources described herein.

In some examples, permissions 610 include one or more access permissions related to an operation that a member can perform in association with objects list in, for example, object 614. There can be policies that are correlated with permissions 610, roles and attributes. For example, based on different types of policies illustrated in policy class 632, different policy enforcement 634 or ACL policy 636 can be related.

Figure 7:
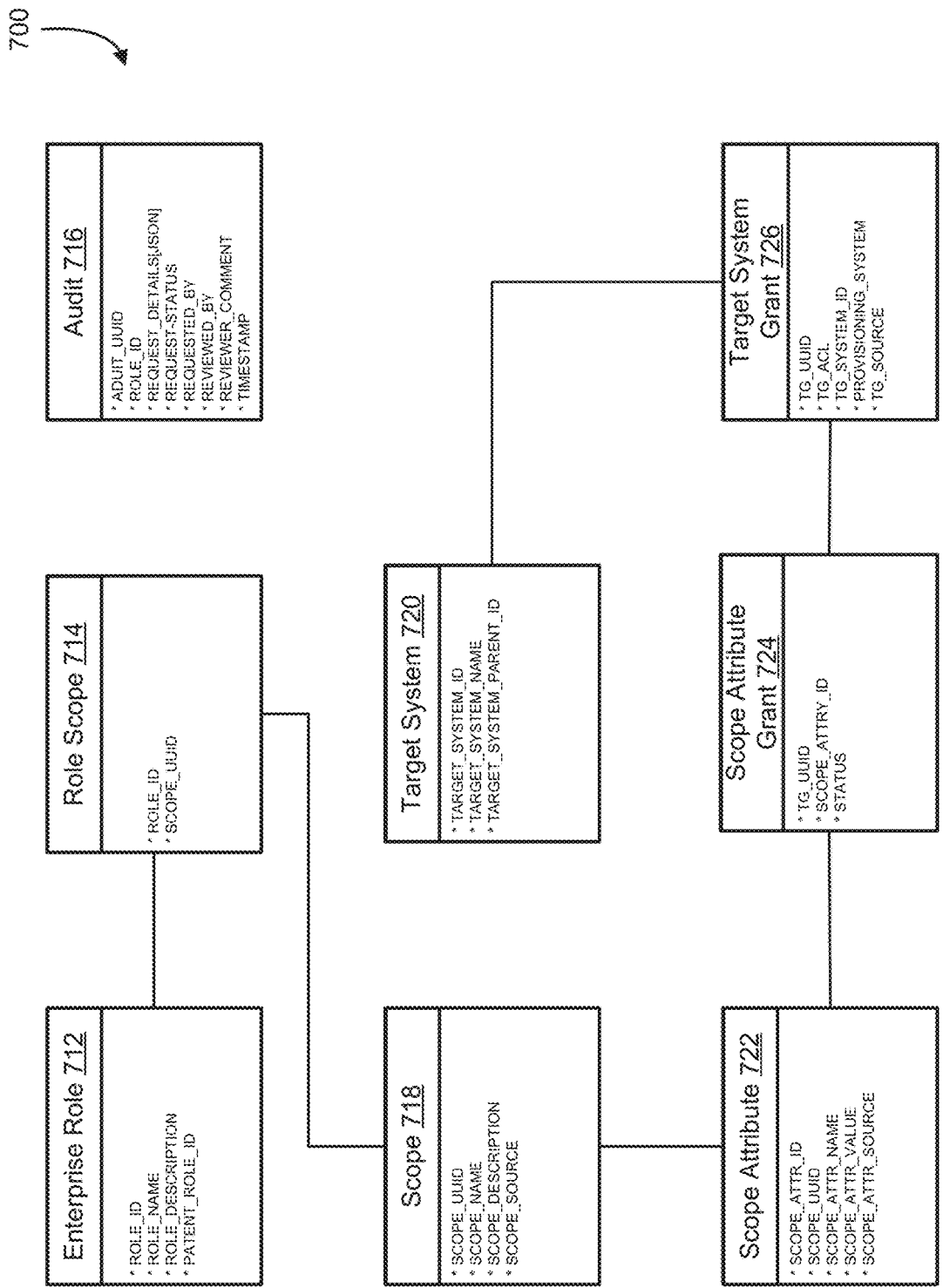
FIG. 7 is an example of a data model to grant access permissions for a system, in accordance with an embodiment.

FIG. 7 is an example of data model 700 to grant access permissions for a system, in accordance with an embodiment. Data model 700 is a combination of at least two distinct models, which are attribute based access control (ABAC) model and role-based access control (RBAC) model. ABAC model and RBAC model are further described in conjunction with FIG. 5. In at least one embodiment, data model 700 can be usable by management system 120 illustrated in FIG. 1 to maintain and manage access permission setups. Additionally, data model 700 can be used to configure access permissions for one or more systems, such as, request support system 130 illustrated in FIG. 1. For example, data model 700 is used in response to a request for access permissions sent from one or more entities such as second entity 104 illustrated in FIG. 1 to request support system 130 illustrated in FIG. 1. In some examples data model 700 can be used by system 100 illustrated in FIG. 1, system 200 illustrated in FIG. 2, system 300 illustrated in FIG. 3, and/or system 400 illustrated in FIG. 4 to manage and/or provision access permissions.

In some examples, links between enterprise role 712, role scope 714, scope 718, scope attribute 722, and scope attribute grant 724 can identify the associations between the scopes of roles and attributes. Based on those links, target system grant 726 and target system 720 can be determined. For each node, identifiers (e.g., role_ID, scope_UUID, scope_ATTR_ID, TG_UUID, target_system_ID) are determined. As a result, data model 700 represents associations between computing resources (e.g., target system 720, target system grant 726), attributes (e.g., scope 718, scope attribute 722, scope attribute grant 724), and roles (e.g., enterprise role 712, role scope 714). The associations and definitions of each node of data model 700 can be modified based on audit 716.

Data model 700 can be represented by the following instructions/requests:

//Enterprise Role
{"type": "ROLE", "action": "see above", "roleid": "developer", "rolename": "developer", "parent": "parent_role_id" }
//Scope
{"type": "SCOPE", "action": "ADD/MODIFY/DELETE", "scopeid":"uuid_1", "scopename": "lightspeed 165075", "scopesource": "lightspeed":}
//Target System
{"type": "TARGET_SYSTEM", "action": "ADD/MODIFY DELETE", "target_system_id": "tg1", "name": bitbucket", "parented": "sourcecontrol" }
//Scope Attribute
{"type": "SCOPE_ATTR", "action": "ADD/MODIFY DELETE", "scope_item_id": "uuid_2", "scope_item_name": "project", "scopeitemvalue": "ebac", "scopeid": "uuid_1" }
//Role Scope
{"type": "ROLE_SCOPE", "action": "ATTACH/DETACH", "scopeid": "tg1", "uuid_1": roleid" "developer" }
//Scope(s) to Target
{"type": "SCOPE_TARGET", "action": "ATTACH/DETACH", "scope_item_id": "uuid_2", "tguuid": "tg_uuid3", "status": "PENDING/APPROVED/REJECTED" }
//Target System Grant
{"type": "TARGET_GRANT", "action": "ADD/MODIFY DELETE", "target acl": "NAMapp_app_c-to_bb", "target_system": "tg1", "provisioning_system": "ActiveDirectory", "source": "LIGHTSPEED/DRIFT/EBAC" }

Figure 8:
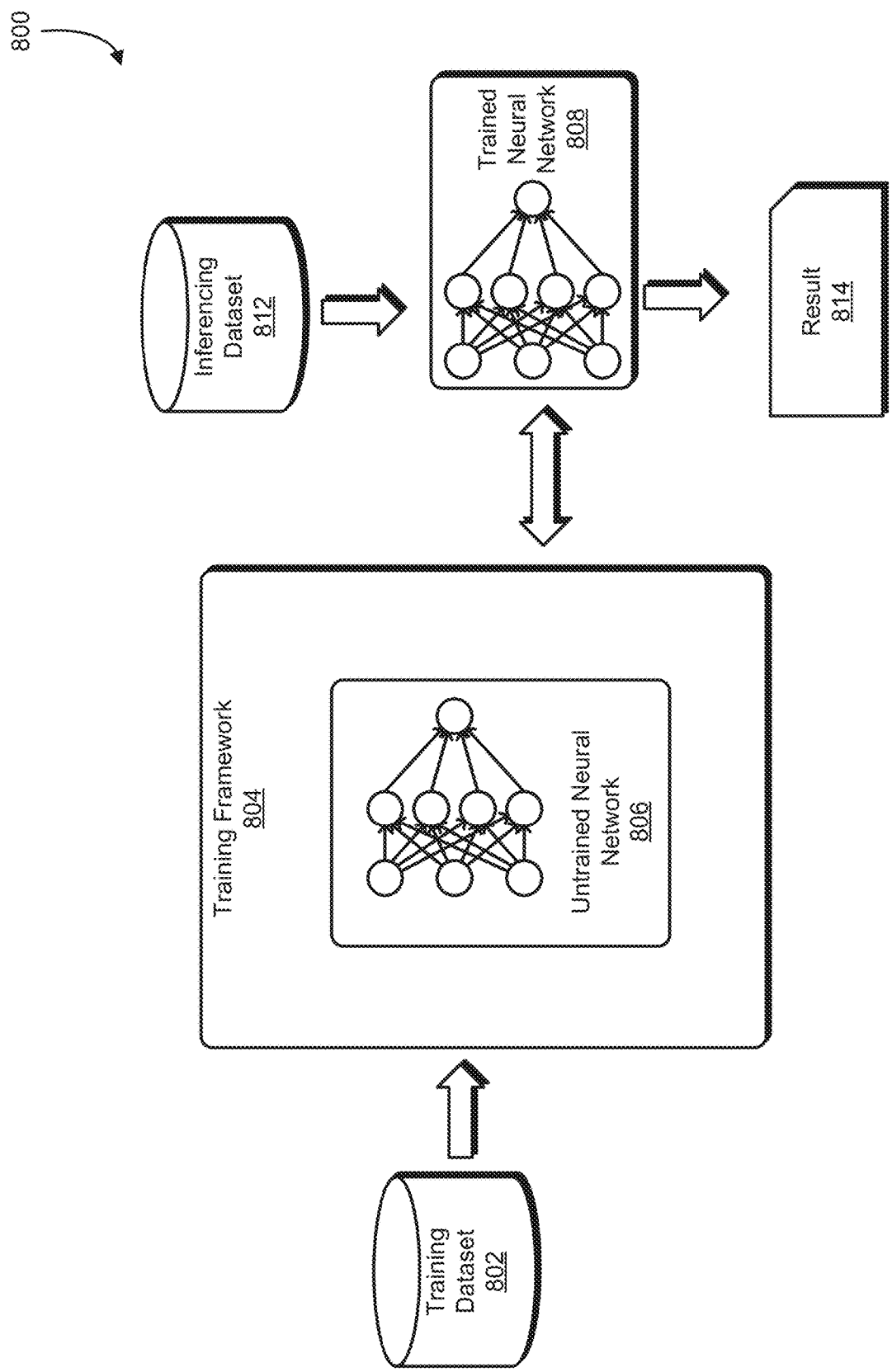
FIG. 8 illustrates an example of a system to perform neural network training and inferencing, in accordance with an embodiment.

FIG. 8 illustrates an example of system 800 to perform neural network training and inferencing, in accordance with an embodiment. System 800 may train untrained neural network 806 using a training dataset 802. An untrained neural network may refer to a neural network architecture that has been initialized but not yet exposed to any training data (e.g., training dataset 802). Untrained neural network 806 may lack the capability to make accurate predictions or decisions. Training framework 804 can be a PyTorch framework, whereas in other embodiments, training framework 804 can be a TensorFlow, Boost, Caffe, Microsoft Cognitive Toolkit/CNTK, MXNet, Chainer, Keras, Deeplearning4j, or other training framework. Training framework 804 may train an untrained neural network 806 and enables it to be trained using processing resources (e.g., processor 112, processor 122, processor 132 illustrated in FIG. 1) described herein to generate a trained neural network 808. Determining initial weights of untrained neural network 806 may include performing Zero Initialization, which sets all weights to zero. In other examples, determining initial weights of untrained neural network 806 may include performing one or more of (1) random Initialization, where weights are set to small random values; (2) Glorot Initialization that adjusts the scale of the weights according to the number of input and output neurons; or (3) He Initialization that sets weights with a variance scaled by the number of input neurons. Training may be performed in either a supervised, partially supervised, or unsupervised manner. Also, training may include federated learning, where multiple decentralized devices or servers collaboratively train a model while keeping the training data localized.

In at least one embodiment, untrained neural network 806 can be trained using supervised learning, wherein training dataset 802 includes an input paired with a desired output for an input, or where training dataset 802 includes input having a known output and an output of untrained neural network 806 is manually graded. Untrained neural network 806 can be trained in a supervised manner and processes inputs from training dataset 802 and compares resulting outputs against a set of expected or desired outputs. Errors can be propagated back through untrained neural network 806. Training framework 804 can adjust weights that control untrained neural network 806. Training framework 804 may include tools to monitor how well untrained neural network 806 is converging towards a model, such as trained neural network 808, suitable to generating correct answers, such as in result 814, based on input data such as an inferencing dataset 812. Training framework 804 may train untrained neural network 806 repeatedly while adjusting weights to refine an output of untrained neural network 806 using a loss function and adjustment algorithm, such as stochastic gradient descent. For retraining the trained neural network 808 using the training framework 804, the loss function may include dice loss and adapted dice loss to encourage the trained neural network 808 to generate more conservative prediction by modifying one or more hyperparameters. Training framework 804 may train untrained neural network 806 until untrained neural network 806 achieves a desired accuracy. Trained neural network 808 can then be deployed to implement any number of machine learning operations.

In some examples, there can be one or more neural networks (separate from untrained neural network 806 and trained neural network 808) that generates training dataset 802. For example, the one or more neural networks may include Generative Adversarial Networks (GANs) or Variational Autoencoders (VAEs) that mimic the characteristics of a genuine dataset. The synthetic images can be accompanied by accurate segmentation maps that label different parts of the image according to predefined categories.

In at least one embodiment, untrained neural network 806 can be trained using unsupervised learning, wherein untrained neural network 806 attempts to train itself using unlabeled data. Unsupervised learning training dataset 802 can include input data without any associated output data or ground truth data. Untrained neural network 806 can learn groupings within training dataset 802 and can determine how individual inputs are related to untrained dataset 802. Unsupervised training can be used to generate a self-organizing map in trained neural network 808 capable of performing operations useful in reducing dimensionality of inferencing dataset 812. Unsupervised training can also be used to perform anomaly detection, which allows identification of data points in inferencing dataset 812 that deviate from normal patterns of inferencing dataset 812.

Semi-supervised learning may be used, which refers to a technique in which training dataset 802 includes a mix of labeled and unlabeled data. Training framework 804 may be used to perform incremental learning, such as through transferred learning techniques. The incremental learning may enable trained neural network 808 to adapt to inferencing dataset 812 without forgetting knowledge instilled within trained neural network 808 during initial training.

Figure 9:
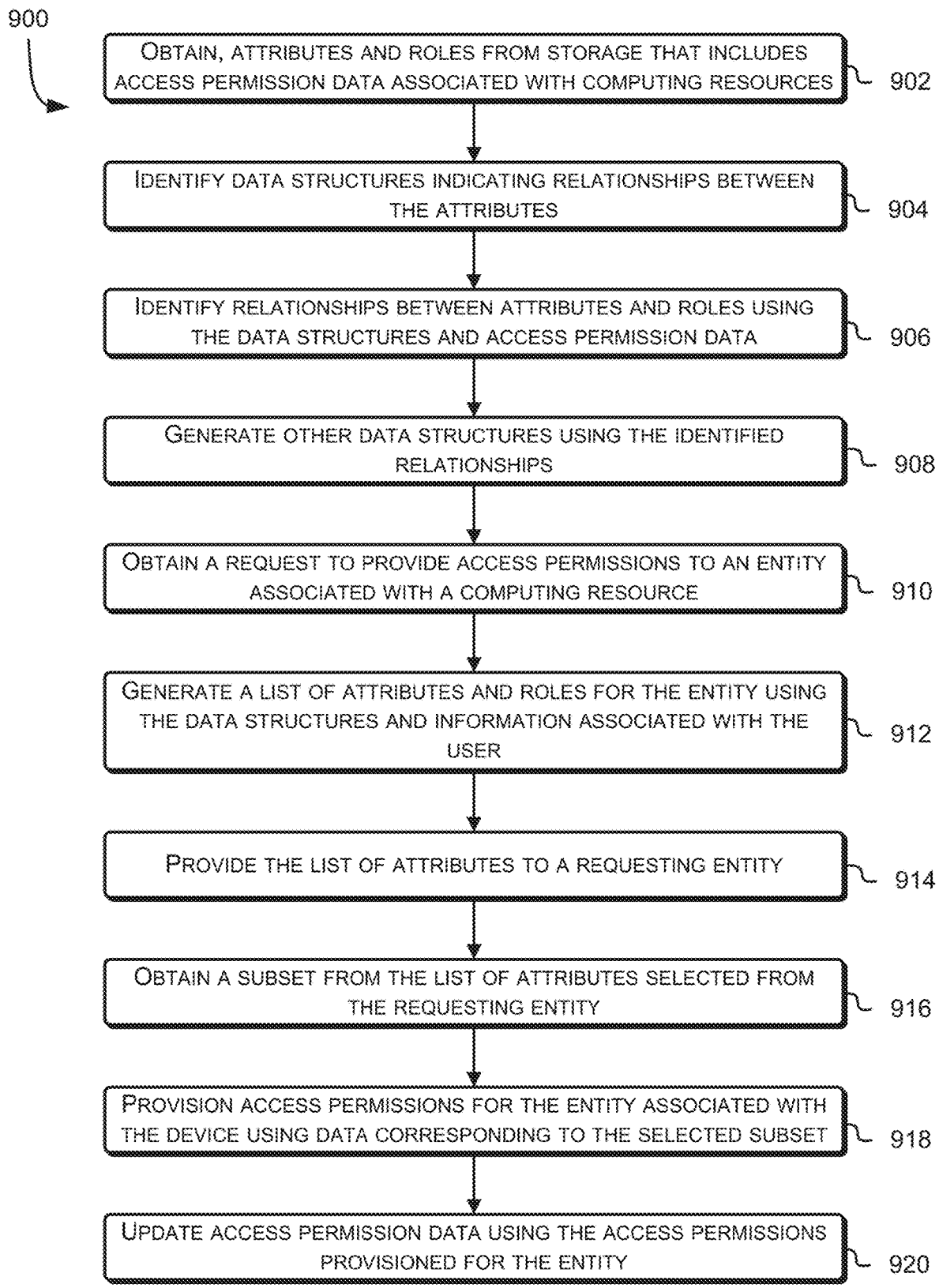
FIG. 9 is a flowchart that illustrates an example of access control management, in accordance with an embodiment.

FIG. 9 is a flowchart that illustrates an example process 900 of access control management, in accordance with an embodiment. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed by any suitable system (e.g., first entity 102, second entity 104, access control system 110, processor 112, access control engine 114, management system 120, processor 122, policy engine 124, request support system 130, processor 132, provision engine 136, authorization engine 134 illustrated in FIG. 1, access control engine 220 illustrated in FIG. 2, first entity 312, authorization engine 310, second entities 320, access control engine 330 illustrated in FIG. 3, first entity 410, authorization engine 420, access control engine 430, second entity 452, third entity 454 illustrated in FIG. 4, training framework 804 illustrated in FIG. 8, entity 1102, authorization engine 1104, access control engine 1106, provision engine 1108 illustrated in FIG. 11, and one or more of hardware and software described in conjunction with FIG. 1). The process 900 may include a series of operations wherein software release criteria is obtained, status information is monitored, notification is provided, request to deploy software package is obtained, and the software package is deployed.

At block 902, process 900 may include obtaining attributes and roles from storage that includes access permission data associated with computing resources. The attributes may include various attributes that are within one or more data structures described in conjunction with FIG. 5. The attributes may include user attribute 602, environment attribute 606, and object attribute 622 illustrated in FIG. 6. The attributes may include scope 718 and scope attribute 722 illustrated in FIG. 7. The roles may include developer role 511, QA tester role 512, and IT support role 513 illustrated in FIG. 5. The roles may include enterprise role 712 and role scope 714 illustrated in FIG. 7. The computing resources may include computing resource #1 442 or computing resource #2 444 illustrated in FIG. 4.

At block 904, process 900 may further include identifying a data structure indicating relationships between the attributes. In some examples, more than one data structure is identified. The data structure may include one or more portions of data model 600 illustrated in FIG. 6. The data structure may include user graph 510, first object graph 532, second object graph 534, and third object graph 536 illustrated in FIG. 5.

At block 906, process 900 may further include identifying relationships between attributes and roles using the data structures and access permissions data. In some examples, relationships between user graph 510, first object graph 532, second object graph 534, and third object graph 536 illustrated in FIG. 5 are identified. The historical data may include access records 211, IT support service records 212, human resource records 213, inquiry records 214, application records 215, and data management records 216 illustrated in FIG. 2. In other examples, one or more neural networks trained using training framework 804 illustrated in FIG. 8 are used to infer relationships between attributes and roles. Other examples of neural networks are further described in conjunction with FIGS. 1 and 2.

At block 908, process 900 may further include generating other data structures using the identified relationships. Other data structures can be created by linking two or more data structures (e.g., user graph 510, first object graph 532, second object graph 534, and third object graph 536 illustrated in FIG. 5). In some examples, the other data structure includes data model 600 illustrated in FIG. 6.

At block 910, process 900 may further include obtaining one or more requests to provide access permissions to an entity associated with one or more computing resources. The entity may include, for example, second entity 452 and third entity 454 illustrated in FIG. 4.

At block 912, process 900 may further include generating a list of attributes and roles for the entity using the data structures and information associated with the user. This may include determining whether the information matches one or more attributes or one or more roles within the data structures.

At block 914, process 900 may further include providing the list of attributes to a requesting entity. In some examples, the requesting entity may include second entity 104 illustrated in FIG. 1 and first entity 410 illustrated in FIG. 4. In other examples, the requesting entity may be the same as the entity that is to receive the access permissions. The list may include sets of attributes and roles 314 illustrated in FIG. 3. At block 916, process 900 may further include obtaining a subset from the list of attributes selected from the requesting entity.

At block 918, process 900 may further include provisioning access permissions for the entity associated with the computing resource using data corresponding to the selected subset. This may include comparing historical access permissions data with the selected subset and provisioning the access permissions based on the comparison. In some examples, The provisioning of access permissions may include providing one or more access tokens to the entity, allowing it to send these tokens with requests for computing resources. Consequently, upon verification of the access tokens, the entity can access the computing resource.

At block 920, process 900 may further include updating access permission data using the access permissions provisioned for the entity. In some examples, the access permissions provisioned for the entity becomes part of access records 211 illustrated in FIG. 2. Note that one or more of the operations performed in blocks 902-920 may be performed in various orders and combinations, including in parallel.

Figure 10:
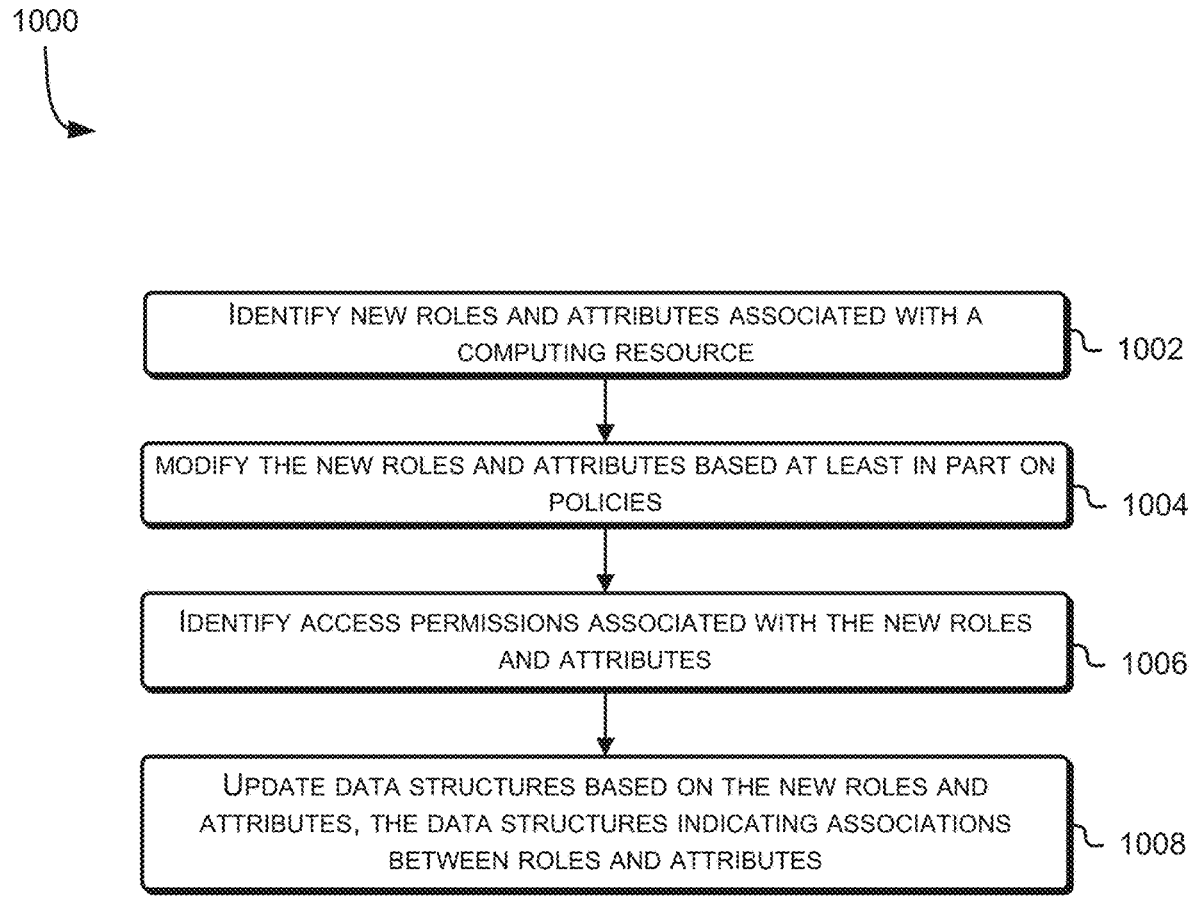
FIG. 10 is a flowchart that illustrates an example of modification of roles and attributes, in accordance with an embodiment.

FIG. 10 is a flowchart that illustrates an example process 1000 of modification of roles and attributes, in accordance with an embodiment. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 1000 may be performed by any suitable system (e.g., first entity 102, second entity 104, access control system 110, processor 112, access control engine 114, management system 120, processor 122, policy engine 124, request support system 130, processor 132, provision engine 136, authorization engine 134 illustrated in FIG. 1, access control engine 220 illustrated in FIG. 2, first entity 312, authorization engine 310, second entities 320, access control engine 330 illustrated in FIG. 3, first entity 410, authorization engine 420, access control engine 430, second entity 452, third entity 454 illustrated in FIG. 4, training framework 804 illustrated in FIG. 8, entity 1102, authorization engine 1104, access control engine 1106, provision engine 1108 illustrated in FIG. 11, and one or more of hardware and software described in conjunction with FIG. 1). The process 1000 may include a series of operations wherein software release criteria is obtained, status information is monitored, notification is provided, request to deploy software package is obtained, and the software package is deployed.

At block 1002, process 1000 may include identifying new roles and attributes associated with a computing resource. The computing resource can be an existing resource or a new computing resource available to entities or an organization. The computing resources may include computing resource #1 442 or computing resource #2 444 illustrated in FIG. 4. The new roles and attributes may include new attributes, roles, or permissions 314 illustrated in FIG. 3.

At block 1004, process 1000 may further include modifying new roles and attributes associated with a computing resource. In some examples, management entities such as management system 120 illustrated in FIG. 1 or second entities 320 illustrated in FIG. 2 can modify new roles and attributes based on one or more policies (e.g., policy graph 520 illustrated in FIG. 5, policy class 632, policy enforcement 634, ACL policy 636 illustrated in FIG. 6) associated with the computing resource.

At block 1006, process 1000 may further include identifying access permissions associated with the new roles and attributes. This can be based on access data such as historical access information 334 illustrated in FIG. 3. At block 1008, Process 1000 may further include updating data structures based on the new roles and attributes, where the data structures (e.g., user graph 510, first object graph 532, second object graph 534, and third object graph 536 illustrated in FIG. 5) indicate associations between roles and attributes.

Note that one or more of the operations performed in blocks 1002-1008 may be performed in various orders and combinations, including in parallel. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 11:
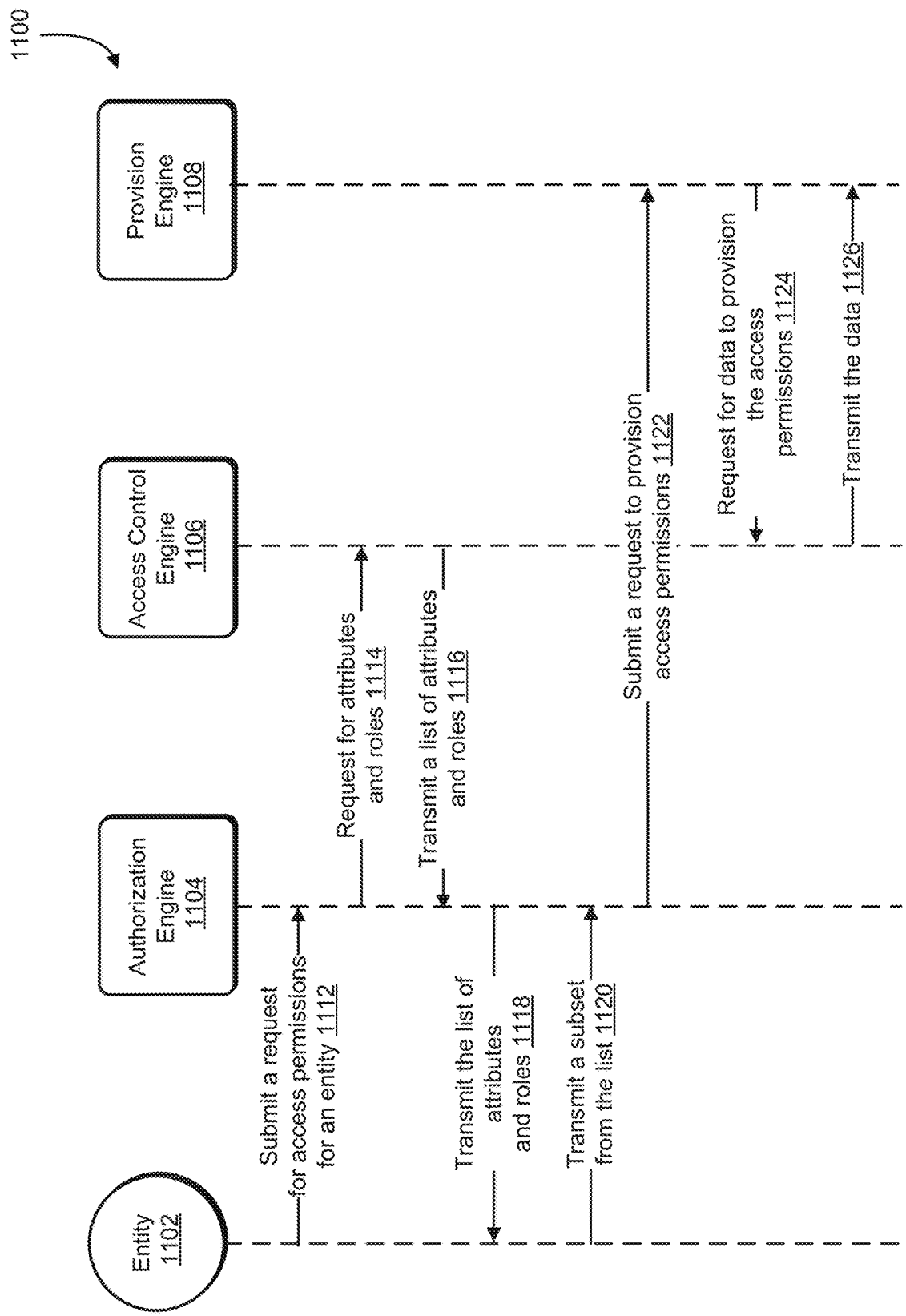
FIG. 11 illustrates a flowchart that illustrates an example of access permission provisioning, in accordance with an embodiment.

FIG. 11 illustrates a flowchart that illustrates an example process 1100 of access permission provisioning, in accordance with an embodiment.

At block 1112, process 1100 may include entity 1102 submitting a request for access permissions for an entity, where entity 1102 is the entity or a requesting entity that is obtaining the access permissions on behalf of the entity that needs the access permissions. Entity 1102 may include second entity 104 illustrated in FIG. 1 and first entity 410 illustrated in FIG. 4.

At block 1114, process 1100 may further include authorization engine 1104 requesting, to access control engine 1106, attributes and roles for the entity. Authorization engine 1104 may refer to one or more of the software and hardware described in conjunction with FIG. 1 that enable entities to obtain access permissions. Authorization engine 1104 may include authorization engine 134 illustrated in FIG. 1, authorization engine 310 illustrated in FIG. 3, and authorization engine 420 illustrated in FIG. 4. Process 1100 may further include access control engine 1106 transmitting to authorization engine 1104 a list of attributes and roles that appear to be relevant to the entity in response to the request from authorization engine 1104. Access control engine 1106 may refer to one or more of the software and hardware described in conjunction with FIG. 1 that manage access controls by identifying relationships between roles, policies, and attributes based on historical access data. Access control engine 1106 may include access control engine 114 illustrated in FIG. 1, access control engine 220 illustrated in FIG. 2, access control engine 330 illustrated in FIG. 3, and access control engine 430 illustrated in FIG. 4.

At block 1116, process 1100 may further include access control engine 1106 transmitting to authorization engine 1104 a list of attributes and roles that appear to be relevant to the entity in response to the request from authorization engine 1104. At block 1118, process 1100 may further include authorization engine 1104 forwarding the list of attributes and roles to entity 1102. In some examples, authorization engine 1104 displays the list of attributes and roles through the GUI.

At block 1120, process 1100 may further include entity 1102 selecting a subset from the list and transmitting the subset to authorization engine 1104. Entity 1102 may use GUI to indicate the selection. At block 1122, process 1100 may further include authorization engine 1104 submitting a request, to provision engine 1108, access permissions for the entity. Provision engine 1108 may refer to one or more of the software and hardware described in conjunction with FIG. 1 that provisions access permissions for entities to have access to one or more computing resources. Provision engine 1108 may include provision engine 136 illustrated in FIG. 1.

At block 1124, process 1100 may further include provision engine 1108 requesting data to provision the access permissions for the entity. At block 1126, process 1100 may further include the access control engine 1106 transmitting the data to the provision engine 1108. Process 1100 may further include the provision engine 1108 provisioning the access permissions for the entity based on the requested data, where the details of this are further described in conjunction with FIG. 1. In some examples, the data includes historical access information 334 illustrated in FIG. 3.

Note that one or more of the operations performed in blocks 1102-1126 may be performed in various orders and combinations, including in parallel. Some or all of the process 1100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 12:
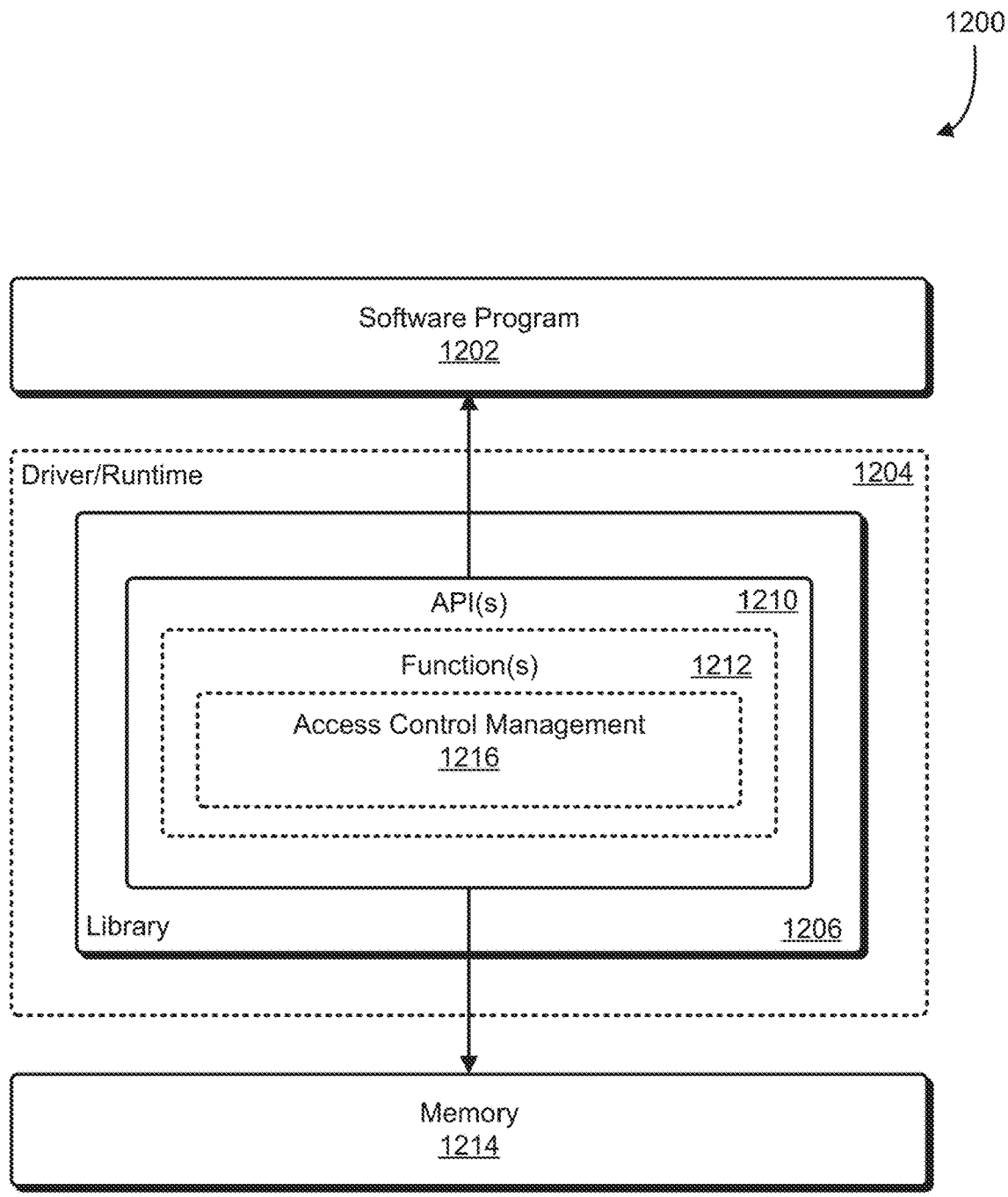
FIG. 12 illustrates an example of system to manage access controls using application programming interface (API), in accordance with at least one embodiment.

FIG. 12 is a block diagram illustrating driver and/or runtime software comprising one or more libraries to provide one or more application programming interfaces (APIs), in accordance with at least one embodiment. The one or more APIs may be provided to a system 100 illustrated in FIG. 1 and implemented at a computing device, such as the computing device 1300 illustrated in FIG. 13. A software program 1202 can be a software module. A software program 1202 may comprise one or more software modules. One or more APIs 1210 can be sets of software instructions that, if executed, cause one or more processors (e.g., hardware described in conjunction with FIG. 1) to perform one or more computational operations. One or more APIs 1210 can be distributed or otherwise provided as a part of one or more libraries 1206, runtimes 1204, drivers 1204, and/or any other grouping of software and/or executable code further described herein. One or more APIs 1210 may perform one or more computational operations in response to invocation by software programs 1202. A software program 1202 can be a collection of software code, commands, instructions, or other sequences of text to instruct a computing device to perform one or more computational operations and/or invoke one or more other sets of instructions, such as APIs 1210 or API functions 1212, to be executed. In some examples, functionality provided by one or more APIs 1210 may include software functions 1212.

In at least one embodiment, one or more APIs 1210 are hardware interfaces to one or more circuits to perform one or more computational operations. One or more APIs 1210 described herein are implemented as one or more circuits to perform one or more techniques described above in conjunction with FIGS. 1-11. Additionally, one or more software programs 1002 comprise instructions that, if executed, cause one or more hardware devices and/or circuits to perform one or more techniques described above in conjunction with FIGS. 1-11.

In at least one embodiment, software programs 1202, such as user-implemented software programs, may utilize one or more APIs 1210 to perform various computing operations, such as memory reservation, matrix multiplication, arithmetic operations, or any computing operation performed by any hardware described in conjunction with FIG. 1. One or more APIs 1210 can provide a set of callable functions 1212, referred to herein as APIs, API functions, and/or functions, that individually perform one or more computing operations. For example, one or more APIs 1210 provide functions 1212 to perform access code management 1216, which are further described in conjunction with FIGS. 1-11. In some examples, feature and requirement management 1216 includes performing one or more blocks of process 900 illustrated in FIG. 9 and process 1000 illustrated in FIG. 10 and/or one or more steps of swimlane diagram 1100 illustrated in FIG. 11.

In at least one embodiment, an interface can be software instructions that, if executed, provide access to one or more functions 1212 provided by one or more APIs 1210. A software program 1202 may use a local interface when a software developer compiles the one or more software programs 1202 in conjunction with one or more libraries 1206 comprising or otherwise providing access to one or more APIs 1210. One or more software programs 1202 can be compiled statically in conjunction with pre-compiled libraries 1206 or uncompiled source code comprising instructions to perform one or more APIs 1210. One or more software programs 1202 can be compiled dynamically and the one or more software programs 1202 can utilize a linker to link to one or more pre-compiled libraries 1206 comprising one or more APIs 1210.

In at least one embodiment, a software program 1202 may use a remote interface when a software developer executes a software program that utilizes or otherwise communicates with a library 1206 comprising one or more APIs 1210 over a network or other remote communication medium. One or more libraries 1206 comprising one or more APIs 1210 can be performed by a remote computing service, such as a computing resource service provider. In another embodiment, one or more libraries 1206 comprising one or more APIs 1210 can be performed by any other computing host providing the one or more APIs 1210 to one or more software programs 1202.

In at least one embodiment, a processor performing or using one or more software programs 1202 may call, use, perform, or otherwise implement one or more APIs 1210 to allocate and otherwise manage memory 1014 to be used by the software programs 1202. Those software programs 1002 may request a resource management system 1216 receive and API call to obtain an access token, identify permissions, and generate the access token using functions 1212 provided, in an embodiment, by one or more APIs 1210.

In at least one embodiment, an API 1210 can be provided by driver and/or runtime software 1204. Driver and/or runtime software 1204 may refer to data values and software instructions that, if executed, perform or otherwise facilitate operation of one or more functions 1212 of one or more APIs 1210 during load and execution of one or more portions of a software program 1202. Runtime software 1204 may refer to data values and software instructions that, if executed, perform, or otherwise facilitate operation of one or more functions 1212 of one or more APIs 1210 during execution of software program 1202.

In at least one embodiment, one or more APIs 1210 may provide combined arithmetic operations through driver and/or runtime software 1204, as described above. One or more software programs 1202 may utilize one or more APIs 1210 provided by driver and/or runtime software 1004 to allocate or otherwise reserve blocks of memory. One or more APIs 1210 can perform operations performed by different systems (e.g., first entity 102, second entity 104, access control system 110, processor 112, access control engine 114, management system 120, processor 122, policy engine 124, request support system 130, processor 132, provision engine 136, authorization engine 134 illustrated in FIG. 1, access control engine 220 illustrated in FIG. 2, first entity 312, authorization engine 310, second entities 320, access control engine 330 illustrated in FIG. 3, first entity 410, authorization engine 420, access control engine 430, second entity 452, third entity 454 illustrated in FIG. 4, training framework 804 illustrated in FIG. 8, entity 1102, authorization engine 1104, access control engine 1106, provision engine 1108 illustrated in FIG. 11). In at least one embodiment, an exemplary block diagram 1200 depicts one or more processors comprising one or more circuits to perform one or more software programs 1202 to combine two or more APIs 1210 into a single API.

In at least one embodiment, memory 1214 may refer to one or more devices to store data. Memory 1014 may include one or more random access memory (RAM), read-only memory (ROM), flash memory (e.g., USB flash drives, SSD, memory cards), cache memory, hard disk drives (HDDs), virtual memory, graphics memory, optical discs, network attached storage (NAS), cloud storage, tape storage, etc.

Figure 13:
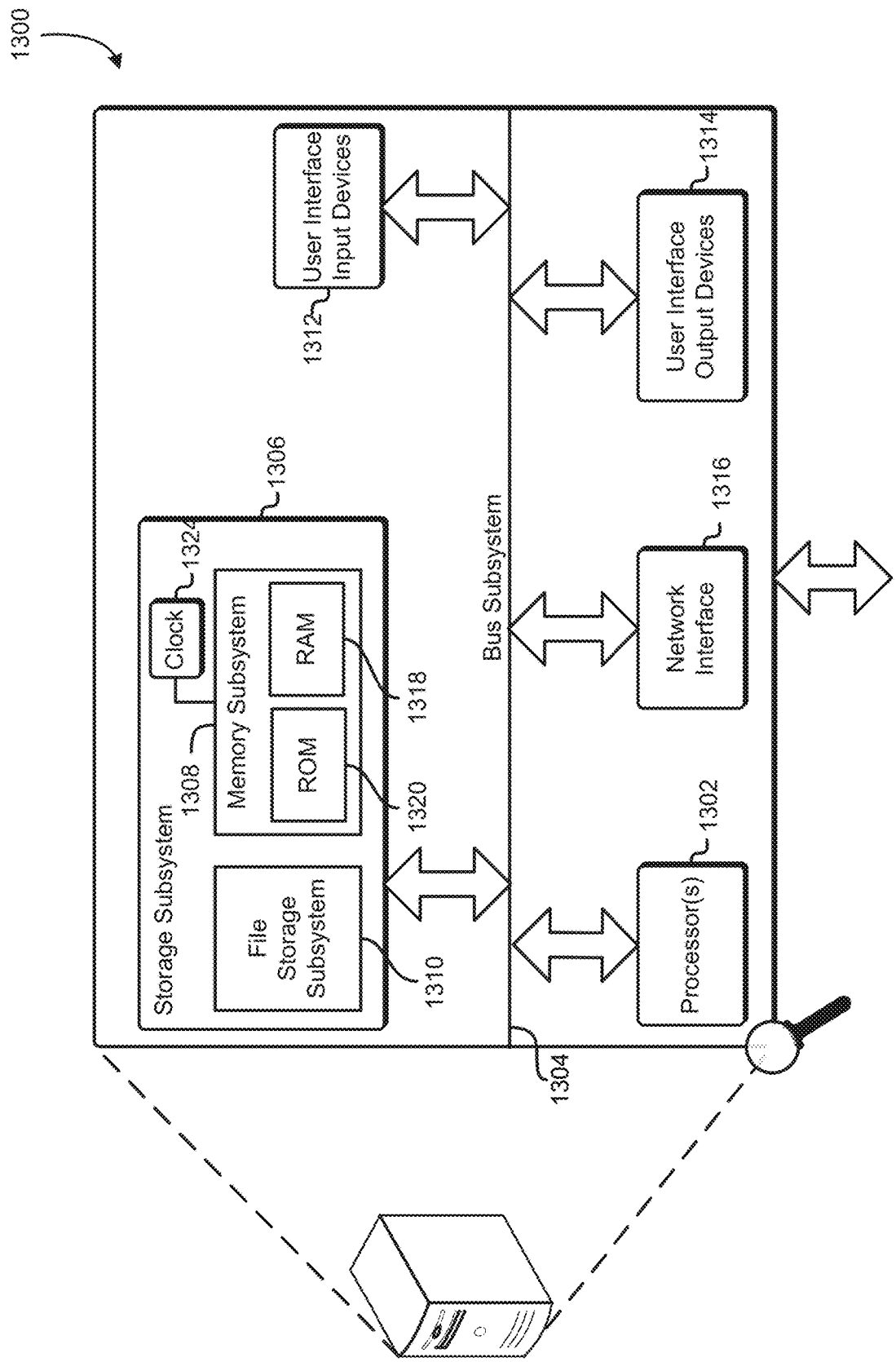
FIG. 13 illustrates a computing device that may be used in accordance with at least one embodiment/an environment in which various embodiments can be implemented.

FIG. 13 is an illustrative, simplified block diagram of a computing device 1300 that can be used to practice at least one embodiment of the present disclosure. In various embodiments, the computing device 1300 includes any appropriate device operable to send and/or receive requests, messages, or information over an appropriate network and convey information back to a user of the device. The computing device 1300 may be used to implement any of the systems illustrated and described above. For example, the computing device 1300 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1300 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 13, the computing device 1300 may include one or more processors 1302 that, in embodiments, communicate with and are operatively coupled to a number of peripheral subsystems via a bus subsystem. In some embodiments, these peripheral subsystems include a storage subsystem 1306, comprising a memory subsystem 1308 and a file/disk storage subsystem 1310, one or more user interface input devices 1312, one or more user interface output devices 1314, and a network interface subsystem 1316. Such storage subsystem 1306 may be used for temporary or long-term storage of information.

In some embodiments, the bus subsystem 1304 may provide a mechanism for enabling the various components and subsystems of computing device 1300 to communicate with each other as intended. Although the bus subsystem 1304 is shown schematically as a single bus, alternative embodiments of the bus subsystem utilize multiple buses. The network interface subsystem 1316 may provide an interface to other computing devices and networks. The network interface subsystem 1316 may serve as an interface for receiving data from and transmitting data to other systems from the computing device 1300. In some embodiments, the bus subsystem 1304 is utilized for communicating data such as details, search terms, and so on. In an embodiment, the network interface subsystem 1316 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1316 is enabled by wired and/or wireless connections and combinations thereof.

In some embodiments, the user interface input devices 1312 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1300. In some embodiments, the one or more user interface output devices 1314 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1300. The one or more user interface output devices 1314 can be used, for example, to present user interfaces to facilitate user interaction with applications performing processes described and variations therein, when such interaction may be appropriate.

In some embodiments, the storage subsystem 1306 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1306. These application modules or instructions can be executed by the one or more processors 1302. In various embodiments, the storage subsystem 1306 additionally provides a repository for storing data used in accordance with the present disclosure. In some embodiments, the storage subsystem 1306 comprises a memory subsystem 1308 and a file/disk storage subsystem 1310.

In embodiments, the memory subsystem 1308 includes a number of memories, such as a main random-access memory (RAM) 1318 for storage of instructions and data during program execution and/or a read only memory (ROM) 1320, in which fixed instructions can be stored. In some embodiments, the file/disk storage subsystem 1310 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1300 includes at least one local clock 1324. The at least one local clock 1324, in some embodiments, is a counter that represents the number of ticks that have transpired from a particular starting date and, in some embodiments, is located integrally within the computing device 1300. In various embodiments, the at least one local clock 1324 is used to synchronize data transfers in the processors for the computing device 1300 and the subsystems included therein at specific clock pulses and can be used to coordinate synchronous operations between the computing device 1300 and other systems in a data center. In another embodiment, the local clock is a programmable interval timer.

The computing device 1300 could be of any of a variety of types, including a portable computer device, tablet computer, a workstation, or any other device described below. Additionally, the computing device 1300 can include another device that, in some embodiments, can be connected to the computing device 1300 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1300 for processing. Due to the ever-changing nature of computers and networks, the description of the computing device 1300 depicted in FIG. 13 is intended only as a specific example for purposes of illustrating the preferred embodiment of the device. Many other configurations having more or fewer components than the system depicted in FIG. 13 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1300 may include any appropriate hardware, software, and firmware for integrating with a data store as needed to execute aspects of one or more applications for the computing device 1300 to manage some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1300 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1300 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1300 may provide the content in one or more forms including, but not limited to, forms that are perceptible to the user audibly, visually, and/or through other senses. The handling of requests and responses, as well as the delivery of content, in an embodiment, is managed by the computing device 1300 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1300 typically will include an operating system that provides executable program instructions for the general administration and operation of the computing device 1300 and includes a computer-readable storage medium (e.g., a hard disk, random access memory (RAM), read only memory (ROM), etc.) storing instructions that if executed (e.g., as a result of being executed) by a processor of the computing device 1300 cause or otherwise allow the computing device 1300 to perform its intended functions (e.g., the functions are performed as a result of one or more processors of the computing device 1300 executing instructions stored on a computer-readable storage medium).

In an embodiment, the computing device 1300 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 1300 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 1300 is capable of storing, retrieving, and accessing structured or unstructured data. In an embodiment, computing device 1300 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

At least one embodiment of the disclosure can be described in view of the following clauses:

1. A system, comprising:
   one or more processors; and
   one or more non-transitory, computer-readable mediums comprising instructions recorded thereon that, as a result of execution by the one or more processors, causes the system to at least:
   obtain, from a storage device that includes previous access permissions data associated with one or more computing resources, a plurality of attributes associated with the previous access permissions data and a plurality of roles associated with the previous access permissions data;
   generate a first data structure indicating first correlations between attributes of the plurality of attributes;
   identify second correlations between the first data structure and the plurality of roles;
   generate a second data structure indicating an association between at least one of plurality of attributes and at least one of plurality of roles based, at least in part, on the second correlations; and
   cause an access token representing access permissions to the one or more computing resources to be granted to a user, the access token being derived, at least in part, using the second data structure.

2. The system of claim 1, wherein the instructions that cause the system to cause the access token to be granted further includes instructions that further causes the system to:
   generate a set of attributes and a set of roles for the user based, at least in part, on the second data structure and information associated with the user; and
   provide the set of attributes and the set of roles to an entity associated with the user.

3. The system of claim 2, wherein:
   the instructions that cause the system to cause the access token to be provided further includes instructions that further causes the system to:
   obtain an indication that a subset from the set of attributes is selected; and
   cause the access permissions to be granted based, at least in part, on the subset; and
   the access token is usable to obtain access to the one or more computing resources.

4. The system of claim 3, wherein the instructions further includes instructions that further causes the system to record, in the storage device, information associated with the access permissions granted for the user.

5. The system of claim 1, wherein the instructions further includes instructions that further causes the system to update the second data structure based, at least in part, on a plurality of policies associated with the one or more computing resources.

6. A computer-implemented method, comprising:
   obtaining, from a storage device that includes previous access permissions data associated with one or more computing resources, a plurality of attributes comprising attributes of different types;
   generating a first data structure indicating first correlations between attributes of a first subset of the plurality of attributes;
   identifying, based, at least in part, on the previous access permissions data, second correlations between the first data structure and a second subset of the plurality of attributes;
   generating a second data structure indicating an association between the attributes of different types based, at least in part, on the second correlations; and
   in response to a request to access the one or more computing resources, providing one or more access tokens based, at least in part, on the second data structure.

7. The computer-implemented method of claim 6, wherein the second subset of the plurality of attributes comprises one or more roles.

8. The computer-implemented method of claim 6, wherein the second data structure comprises a directed acyclical graph (DAG).

9. The computer-implemented method of claim 6, wherein the second correlations are identified using one or more neural networks.

10. The computer-implemented method of claim 6, wherein the one or more computing resources include an application stack.

11. The computer-implemented method of claim 6, further comprising:
    identifying a role or an attribute that was generated in association with the one or more computing resources; and causing the role or the attribute to be approved by at least indicating the role or the attribute.

12. The computer-implemented method of claim 6, wherein:
the first subset of plurality of attributes is generated, at least in part, according to an attribute-based access control (ABAC) model; and
the second subset of the plurality of attributes is generated, at least in part, according to a role-based access control (RBAC) model.

13. The computer-implemented method of claim 6, wherein the second subset of plurality of roles indicates at least one of:
developer,
information technology (IT) support, or
application manager.

14. A non-transitory computer-readable storage medium storing computer-executable instructions that, as a result of being executed by one or more processors of a computer system, cause the computer system to at least:
receive, from a storage device that includes information associated with one or more computing resources, a plurality of attributes and a plurality of roles;
generate a first data structure indicating first correlations between attributes of the plurality of attributes;
determine second correlations between the first data structure and the plurality of roles based, at least in part, on the information from the storage device; and
generate a second data structure indicating an association between at least one of the plurality of attributes and at least one of the plurality of roles based, at least in part, on the second correlations; and
as a result of receiving a request to access the one or more computing resources, cause one or more access tokens to be transmitted based, at least in part, on the second data structure.

15. The non-transitory computer-readable storage medium of claim 14, wherein the computer-executable instructions that cause the computer system to cause one or more access tokens to be transmitted further include executable instructions that further cause the computer system to:
generate a set of attributes and roles for an entity that transmitted the request based, at least in part, on the second data structure and the information associated with the entity; and transmit the set of attributes and roles.

16. The non-transitory computer-readable storage medium of claim 15, wherein the computer-executable instructions to cause the computer system to cause one or more access tokens to be transmitted further include executable instructions that further cause the computer system to:
receive a subset from the set of attributes and roles that is selected from the set of attributes and roles; and
cause one or more access tokens to be generated granting the subset to configure access permissions for the entity.

17. The non-transitory computer-readable storage medium of claim 14, wherein the information comprises historical access permissions data associated with the one or more computing resources.

18. The non-transitory computer-readable storage medium of claim 14, wherein the second data structure comprises a directed acyclical graph (DAG).

19. The non-transitory computer-readable storage medium of claim 14, wherein the one or more computing resources include an application stack.

20. The non-transitory computer-readable storage medium of claim 14, wherein:
the plurality of attributes is generated, at least in part, according to an attribute-based access control (ABAC) model; and
the plurality of roles is generated, at least in part, according to a role-based access control (RBAC) model.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention, and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
    one or more processors; and
    one or more non-transitory, computer-readable mediums comprising instructions recorded thereon that, as a result of execution by the one or more processors, causes the system to at least:
    obtain, from a storage device that includes previous access permissions data associated with one or more computing resources, a plurality of attributes associated with the previous access permissions data and a plurality of roles associated with the previous access permissions data;
    generate a first graph data structure indicating first correlations between attributes of the plurality of attributes;
    identify second correlations between the first graph data structure and the plurality of roles;
    generate a second graph data structure indicating an association between at least one of the plurality of attributes and at least one of the plurality of roles based, at least in part, on the second correlations; and
    in response to a request for an access token representing access permissions to the one or more computing resources to be granted to a user:
    provide a list of attributes and roles associated with the user, the list being determined, at least in part, on the second graph data structure; and
    generate the access token based, at least in part, on an attribute or a role selected from the list of attributes and roles, wherein the user is granted access to the one or more computing resources upon verification of the access token.

2. The system of claim 1, wherein the list of attributes and roles is provided to an entity associated with the user.

3. The system of claim 1, wherein the instructions that cause the system to generate the access token further includes instructions that further causes the system to:
    obtain, from an entity associated with the user, an indication that the attribute or the role from the list of attributes and roles is selected.

4. The system of claim 1, wherein the instructions further includes instructions that further causes the system to record, in the storage device, information associated with access permissions granted for the user.

5. The system of claim 1, wherein the instructions further includes instructions that further causes the system to update the second graph data structure based, at least in part, on a plurality of policies associated with the one or more computing resources.

6. A computer-implemented method, comprising:
    receiving, from a storage device that includes information associated with one or more computing resources, a plurality of attributes and a plurality of roles;
    generating a first data structure indicating first correlations between attributes of the plurality of attributes;
    determining second correlations between the first data structure and the plurality of roles based, at least in part, on the information from the storage device; and
    generating a second data structure indicating an association between at least one of the plurality of attributes and at least one of the plurality of roles based, at least in part, on the second correlations; and
    as a result of receiving a request to access the one or more computing resources:
    providing a list of attributes and roles based, at least in part, on the second data structure; and
    generating an access token usable to access the one or more computing resources as a result of receiving an indication of an attribute or a role that is selected from the list of attributes and roles, wherein a user is granted access to the one or more computing resources upon verification of the access token.

7. The computer-implemented method of claim 6, wherein the list of attributes and roles are provided to a first entity that transmitted the request to cause the user to receive the access token to use the one or more computing resources.

8. The computer-implemented method of claim 7, further comprising:
    causing access permissions to be configured for the user based, at least in part, on the access token.

9. The computer-implemented method of claim 6, wherein the information comprises historical access permissions data associated with the one or more computing resources.

10. The computer-implemented method of claim 6, wherein the second data structure comprises a directed acyclical graph (DAG), wherein edges of the DAG corresponds to the second correlations.

11. The computer-implemented method of claim 6, wherein the one or more computing resources include an application stack.

12. The computer-implemented method of claim 6, wherein:
    the plurality of attributes is generated, at least in part, according to an attribute-based access control (ABAC) model; and
    the plurality of roles is generated, at least in part, according to a role-based access control (RBAC) model.

13. The computer-implemented method of claim 6, further comprising:
    updating the second data structure based, at least in part, on a plurality of policies associated with the one or more computing resources.

14. A non-transitory computer-readable storage medium storing computer-executable instructions that, as a result of being executed by one or more processors of a computer system, cause the computer system to at least:

receive, from a storage device that includes information associated with one or more computing resources, a plurality of attributes and a plurality of roles;

generate a first data structure indicating first correlations between attributes of the plurality of attributes;

determine second correlations between the first data structure and the plurality of roles based, at least in part, on the information from the storage device; and generate a second data structure indicating an association between at least one of the plurality of attributes and at least one of the plurality of roles based, at least in part, on the second correlations; and as a result of receiving a request to access the one or more computing resources:

provide a list of attributes and roles based, at least in part, on the second data structure; and generate an access token usable to access the one or more computing resources as a result of receiving an indication of an attribute or a role that is selected from the list of attributes and roles, wherein a user is granted access to the one or more computing resources upon verification of the access token.

15. The non-transitory computer-readable storage medium of claim 14, wherein the list of attributes and roles are provided to a first entity that transmitted the request to cause the user to receive the access token to use the one or more computing resources.

16. The non-transitory computer-readable storage medium of claim 15, wherein the computer-executable instructions further include executable instructions that further cause the computer system to:

cause access permissions to be configured for the user based, at least in part, on the access token.

17. The non-transitory computer-readable storage medium of claim 14, wherein the information comprises historical access permissions data associated with the one or more computing resources.

18. The non-transitory computer-readable storage medium of claim 14, wherein the second data structure comprises a directed acyclical graph (DAG), wherein edges of the DAG corresponds to the second correlations.

19. The non-transitory computer-readable storage medium of claim 14, wherein the one or more computing resources include an application stack.

20. The non-transitory computer-readable storage medium of claim 14, wherein:

the plurality of attributes is generated, at least in part, according to an attribute-based access control (ABAC) model; and the plurality of roles is generated, at least in part, according to a role-based access control (RBAC) model.

* * * * *